(12) United States Patent
Yoshino et al.

(10) Patent No.: US 10,043,499 B2
(45) Date of Patent: Aug. 7, 2018

(54) PERCUSSION INSTRUMENT, DRUMHEAD FOR PERCUSSION INSTRUMENT, MOLD FOR MANUFACTURE OF DRUMHEAD, AND MANUFACTURING METHOD OF DRUMHEAD

(71) Applicant: ROLAND CORPORATION, Shizuoka (JP)

(72) Inventors: Kiyoshi Yoshino, Shizuoka (JP); Hikaru Yasuno, Shizuoka (JP)

(73) Assignee: ROLAND CORPORATION, Shizuoka (JP)

( * ) Notice: Subject to any disclaimer, the term of this patent is extended or adjusted under 35 U.S.C. 154(b) by 17 days.

(21) Appl. No.: 14/468,321

(22) Filed: Aug. 25, 2014

(65) Prior Publication Data
US 2015/0059554 A1    Mar. 5, 2015

(30) Foreign Application Priority Data

Sep. 2, 2013   (JP) .................................. 2013-181659
Apr. 30, 2014  (JP) .................................. 2014-093797

(51) Int. Cl.
*G10D 13/02*   (2006.01)
*B29D 7/00*    (2006.01)
(Continued)

(52) U.S. Cl.
CPC ............. *G10D 13/027* (2013.01); *B29D 7/00* (2013.01); *G10D 13/024* (2013.01); *B29L 2007/00* (2013.01); *B29L 2009/00* (2013.01)

(58) Field of Classification Search
USPC ........................................................ 84/414
See application file for complete search history.

(56) References Cited

U.S. PATENT DOCUMENTS 2,934,989 A *  5/1960  Belli ....................... C08L 63/00
                                                     220/642
3,668,296 A    6/1972  Criscuolo
(Continued)

FOREIGN PATENT DOCUMENTS

EP       1503364        2/2005
JP       S4911312       1/1974
(Continued)

OTHER PUBLICATIONS

"Response to Office Action of European Counterpart Application", filed on Apr. 4, 2016, p. 1-p. 29.
(Continued)

*Primary Examiner* — Christopher Uhlir
(74) *Attorney, Agent, or Firm* — JCIPRNET

(57) ABSTRACT

A percussion instrument includes: a cylindrical shell portion having an open upper surface side; and a drumhead stretched to be installed on the upper surface side of the shell portion, wherein the drumhead includes: a membrane formed of a membranous material, having a struck head portion configured as a striking face to be struck by a performer and an outer periphery located on an outer circumferential side of the struck head portion; and an annular frame formed of a resin material and having the outer periphery of the membrane fixed thereto, and the drumhead is integrally formed by the membrane and the frame by injection molding.

13 Claims, 21 Drawing Sheets

(51) Int. Cl.
*B29L 7/00* (2006.01)
*B29L 9/00* (2006.01)

(56) References Cited

U.S. PATENT DOCUMENTS

| | | | | |
|---|---|---|---|---|
| 4,214,504 | A * | 7/1980 | Rex | G10D 13/02 84/411 R |
| 4,742,753 | A * | 5/1988 | Speed | G10D 13/027 84/411 R |
| 5,349,891 | A * | 9/1994 | Belli | G10D 13/027 84/411 R |
| 5,385,076 | A * | 1/1995 | Belli | G10D 13/027 84/414 |
| 5,972,276 | A * | 10/1999 | Yasuda | B29C 45/174 264/500 |
| 6,184,451 | B1 * | 2/2001 | Miller | G10D 13/027 84/411 R |
| 6,350,941 | B1 * | 2/2002 | Miller | G10D 13/023 84/411 A |
| 6,765,139 | B2 * | 7/2004 | Belli | G10D 13/023 84/411 R |
| 6,828,494 | B2 * | 12/2004 | Toda | G10D 13/024 84/411 M |
| 6,949,701 | B2 | 9/2005 | Okumura | |
| 7,612,273 | B2 * | 11/2009 | Matsuyuki | G10D 13/024 84/411 A |
| 7,960,634 | B2 * | 6/2011 | Gauger | G10D 13/026 84/421 |
| 2007/0234886 | A1 | 10/2007 | Matsuyuki | |
| 2011/0259572 | A1 | 10/2011 | Muratani | |

FOREIGN PATENT DOCUMENTS

| | | |
|---|---|---|
| JP | 1992135787 | 12/1992 |
| JP | H06-000839 | 1/1994 |
| JP | 2003280635 | 10/2003 |
| JP | 2003302968 | 10/2003 |
| JP | 2007-001232 | 1/2007 |
| JP | 2007-249140 | 9/2007 |
| JP | 2010-111051 | 5/2010 |
| JP | 2011-173268 | 9/2011 |

OTHER PUBLICATIONS

"Search Report of European Counterpart Application," dated Jan. 26, 2015, p. 1-p. 7.
"Office Action of European Counterpart Application (Communication pursuant to Article 94(3) EPC)", dated Dec. 8, 2015, pp. 1-7.
"Respose to Office Action of Europe Counterpart Application", filed on Oct. 21, 2016, p. 1-p. 18.
"Office Action of Europe Counterpart Application", dated Jul. 8, 2016, p. 1-p. 7.
"Office Action of Japan Counterpart Application," with partial English translation thereof, dated Mar. 13, 2018, p. 1-p. 10.

* cited by examiner

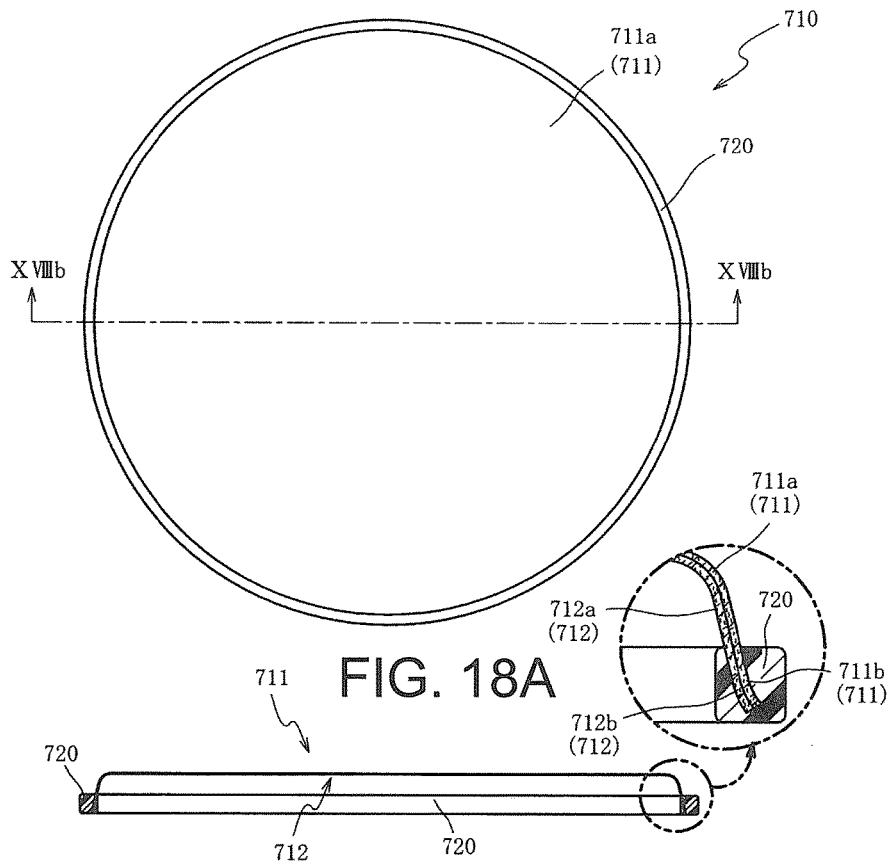
FIG. 18A
FIG. 18B
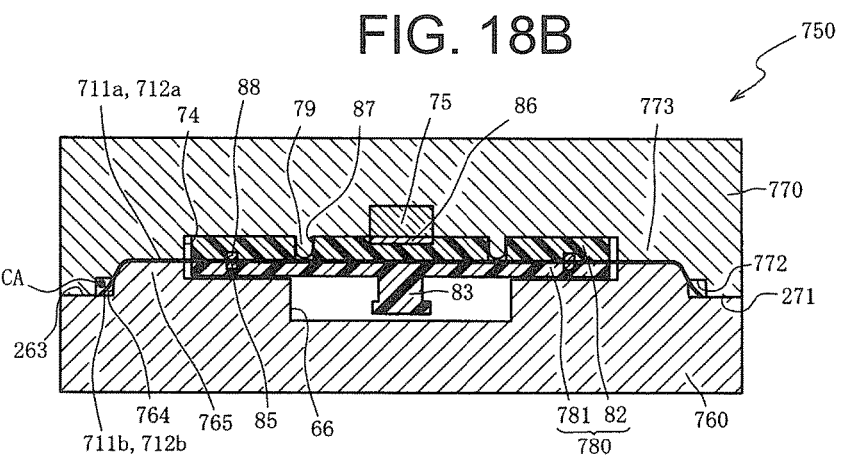
FIG. 18C

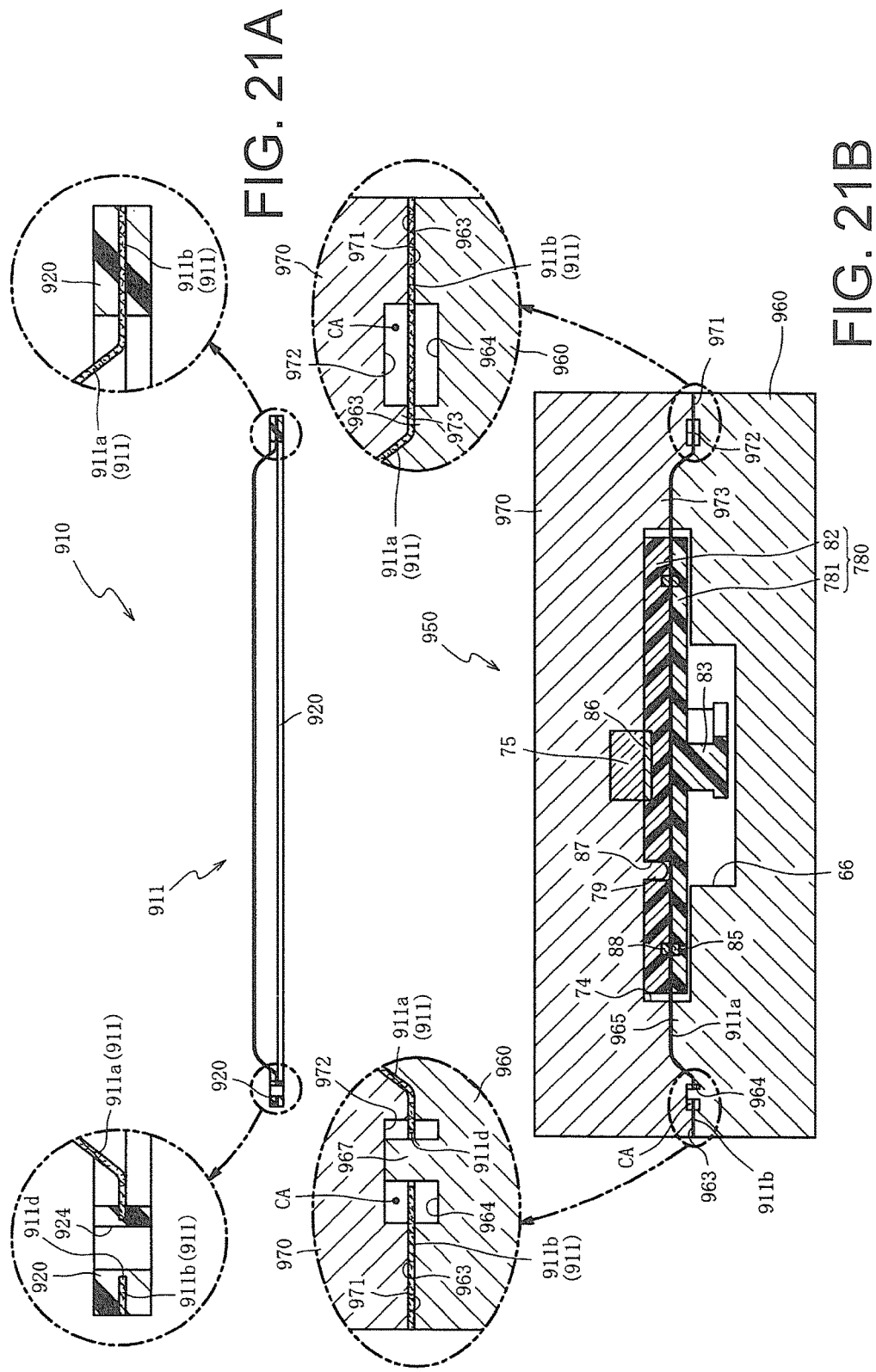

PERCUSSION INSTRUMENT, DRUMHEAD FOR PERCUSSION INSTRUMENT, MOLD FOR MANUFACTURE OF DRUMHEAD, AND MANUFACTURING METHOD OF DRUMHEAD

CROSS-REFERENCE TO RELATED APPLICATIONS

This application claims the priority benefits of Japan application serial no. 2013-181659, filed on Sep. 2, 2013 and Japan application serial no. 2014-093797, filed on Apr. 30, 2014. The entirety of each of the above-mentioned patent applications is hereby incorporated by reference herein and made a part of this specification.

BACKGROUND OF THE INVENTION

Field of the Invention

The present invention relates to a percussion instrument, a drumhead for use in the percussion instrument, a mold for manufacture of the drumhead, and a manufacturing method of a drumhead. More particularly, the present invention relates to a percussion instrument of which manufacturing costs may be kept down, a drumhead for use in the percussion instrument, a mold for manufacture of the drumhead, and a manufacturing method of the drumhead.

Description of Related Art

There is known a percussion instrument in which a cylindrically formed shell portion has an open upper surface side, and a drumhead that constitutes a striking face to be struck by a performer is detachably stretched to be installed on the upper surface side.

A conventional drumhead includes a striking face member and a head frame (Patent Literature 1). The striking face member is a member to be struck by the performer. The head frame is a member fixed to an outer circumferential portion (outer periphery) of the striking face member. The head frame is formed in an annular shape from a metal material or the like.

However, in the above-mentioned conventional drumhead, the outer circumferential portion (outer periphery) of the striking face member is fixed on the head frame by swaging while the outer circumferential portion of the striking face member is wrapped around an iron core. Or, in the above-mentioned conventional drumhead, an adhesive is filled into an inside of the head frame and then the outer circumferential portion of the striking face member is inserted into the inside, thereby fixing the striking face member to the head frame. Consequently, a manufacturing process becomes complicated and manufacturing costs of the drumhead increase.

PRIOR ART LITERATURE

Patent Literature

[Patent Literature 1] Japanese Patent Publication No. 2007-249140 (Paragraph [0030], FIG. 2, etc.)

SUMMARY OF THE INVENTION

The present invention has been accomplished in order to solve the above-mentioned problem. The present invention is intended to provide a percussion instrument of which manufacturing costs may be kept down, and a drumhead for use in the percussion instrument.

According to the percussion instrument of the first technical solution, a drumhead includes a membrane and a frame integrally formed by molding, wherein an outer periphery of the membrane is fixed on the frame. That is, after the outer periphery of the membrane is disposed within a cavity of a mold, a resin material is injected into the cavity of the mold, thereby the frame to which the outer periphery is fixed is molded.

Therefore, a manufacturing process of the drumhead may be simplified compared to that of the conventional drumhead. Accordingly, manufacturing costs may be kept down.

According to the percussion instrument of the second technical solution, a hoop is integrally formed with the frame. Accordingly, in addition to the effect of the percussion instrument of the first technical solution, a number of members of the percussion instrument may be decreased.

According to the percussion instrument of the third technical solution, the membrane is fixed on the frame in a state that an outer edge of the outer periphery is disposed on an inside of the frame. Accordingly, in addition to the effect of the percussion instrument of the first technical solution, the outer periphery may be prevented from protruding from an outer side surface of the molded frame.

Thus, a step of cutting off a part of the outer periphery of the membrane that protrudes from the outer side surface of the frame after molding is unnecessary, and manufacturing steps of the drumhead may be decreased. In addition, since a trace of cutting-off of a part of the outer periphery of the membrane is prevented from remaining on the outer side surface of the frame, the drumhead may be improved in appearance.

According to the percussion instrument of the fourth technical solution, a gate trace is formed on an inner wall surface of a relief recess. Accordingly, in addition to the effect of the percussion instrument of the first technical solution, the gate trace may be made inconspicuous in the appearance of the drumhead. Therefore, the drumhead may be improved in appearance.

According to the percussion instrument of the fifth technical solution, a first cutting-off portion is formed in the outer periphery of the membrane. In the percussion instrument, the outer periphery is fixed within the mold by a pin or the like such that the outer periphery is not turned up because of the injection of the resin material during molding. However, even if in that case, the injected resin material may be spread over from the first cutting-off portion to both upper and lower surface sides of the outer periphery. Therefore, in addition to the effect of the percussion instrument of the first technical solution, defective formation of the frame may be suppressed.

According to the percussion instrument of the sixth technical solution, the frame is formed at a position such that the gate trace corresponds to the first cutting-off portion. That is, a gate for injecting the resin material into the cavity of the mold is formed at the position corresponding to the first cutting-off portion. Thus, the outer periphery may be prevented from being turned up by a force of the injected resin material. In other words, the outer periphery may be suppressed from being fixed on an upper surface or a lower surface of the molded frame while emerging therefrom. Therefore, in addition to the effect of the percussion instrument of the fifth technical solution, the drumhead may be improved in appearance.

According to the percussion instrument of the seventh technical solution, a length of the membrane from an inner edge of the outer periphery in a radial direction is shorter than a shortest distance from the inner edge to the upper surface of the frame. Therefore, even in the case where the outer periphery is turned up by the injected resin material during molding, the outer periphery may be prevented from emerging from the upper surface of the molded frame. Therefore, in addition to the effect of the percussion instrument of the first technical solution, the drumhead may be improved in appearance.

According to the percussion instrument of the eighth technical solution, a bolt hole is formed in the frame. Accordingly, in addition to the effect of the percussion instrument of the first technical solution, the number of members of the percussion instrument may be decreased compared to a case where the bolt hole is formed on another member attached to the frame.

According to the percussion instrument of the ninth technical solution, the outer periphery of the membrane has an outer diameter greater than a diameter of a virtual circle that passes through a plurality of the bolt holes. Accordingly, in addition to the effect of the percussion instrument of the eighth technical solution, it may be ensured that more portions of the membrane are fixed with respect to the frame. Therefore, a fixation strength between the frame and the membrane may be increased.

According to the percussion instrument of the tenth technical solution, second cutting-off portions are formed in the outer periphery of the membrane at positions corresponding to positions where the bolt holes are formed. Thus, the bolt hole formed in the frame by molding may be prevented from being blocked by the outer periphery. That is, an operation of cutting off the outer periphery that blocks the bolt hole after molding the frame is unnecessary. Accordingly, in addition to the effect of the percussion instrument of the ninth technical solution, the manufacturing steps of the drumhead may be decreased.

According to the percussion instrument of the eleventh technical solution, the outer periphery of the membrane is fixed on the frame while a struck head portion of the membrane has looseness. Accordingly, in addition to the effect of the percussion instrument of the first technical solution, a positional relationship between the struck head portion and the frame in a height direction when the drumhead is stretched to be installed over a shell portion to impart appropriate tension to the struck head portion may be properly set.

According to the percussion instrument of the twelfth technical solution, the membrane includes a plurality of the membrane parts, one of the plurality of the membrane parts is set looser than the other of the plurality of the membrane parts. Accordingly, in a state that the drumhead is fixed to the shell portion, the tension imparted to the struck head portion of the one of the membrane parts may be made different from that imparted to the struck head portion of the other of the membrane parts. Therefore, when the struck head portion is struck, vibration generated on the struck head portion of the one of the membrane parts is different from that on the struck head portion of the other of the membrane parts. For this reason, the vibration of the struck head portion of the one of the membrane parts and the vibration of the struck head portion of the other of the membrane parts cancel each other. That is, the vibration of the struck head portion may be attenuated early. Accordingly, in addition to the effect of the percussion instrument of the first technical solution, a percussive sound generated by the striking to the struck head portion may be reduced.

According to the percussion instrument of the thirteenth technical solution, the outer periphery of the membrane is fixed on the frame in the state that the struck head portion has tension imparted thereto. That is, a fixing member for imparting tension to the struck head portion is unnecessary. Accordingly, in addition to the effect of the percussion instrument of the first technical solution, the percussion instrument may be reduced in weight.

According to the percussion instrument of the fourteenth technical solution, an outer edge of the struck head portion protrudes further upward than the outer periphery of the membrane. Accordingly, in addition to the effect of the percussion instrument of the first technical solution, the positional relationship between the struck head portion and the frame in the height direction when the drumhead is stretched to be installed over the shell portion to impart appropriate tension to the struck head portion may be properly set.

The fifteenth technical solution is a drumhead for use in the aforementioned percussion instrument, and has the same effects as the aforementioned percussion instrument.

BRIEF DESCRIPTION OF THE DRAWINGS

FIG. 18A is a top view of a drumhead according to the seventh embodiment.

FIG. 18B is a cross-sectional view of the drumhead taken on line XVIIIb-XVIIIb in FIG. 18A.

FIG. 18C is a cross-sectional view of a mold.

FIG. 21A is a cross-sectional view of the drumhead taken on line XXIa-XXIa in FIG. 20.

FIG. 21B is a cross-sectional view of a mold.

DESCRIPTION OF THE EMBODIMENTS

Figure 1A:
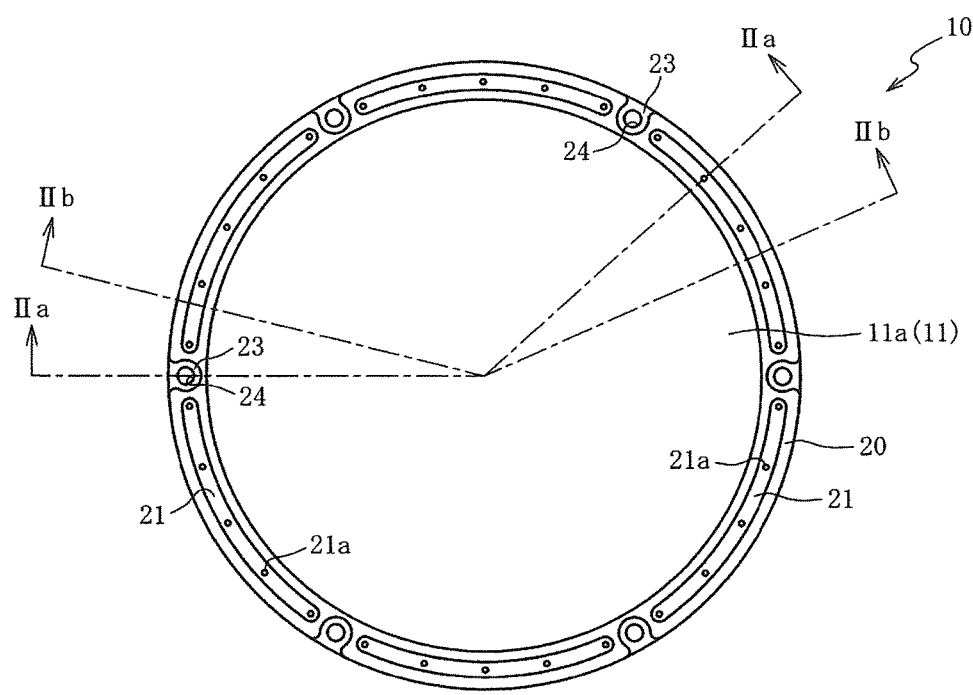
FIG. 1A is a top view of a drumhead according to the first embodiment.
Figure 1B:
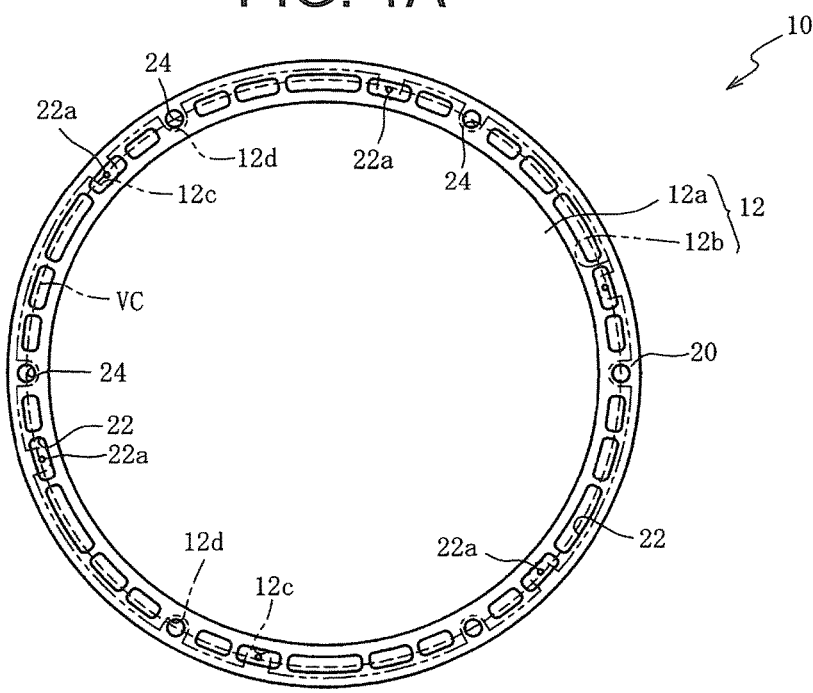
FIG. 1B is a bottom view of the drumhead according to the first embodiment.
Figure 2A:
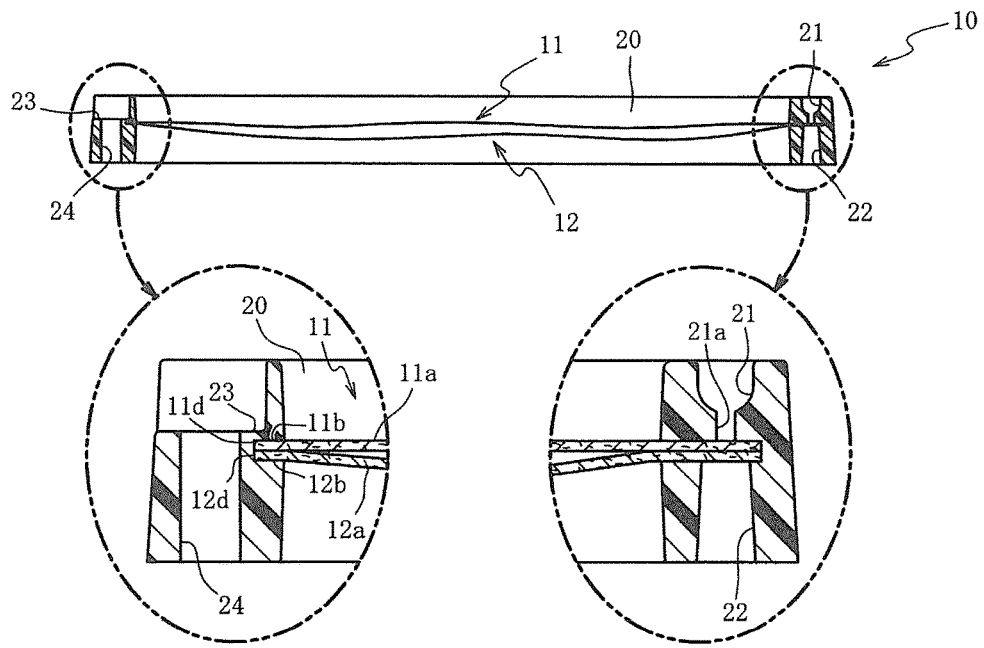
FIG. 2A is a cross-sectional view of the drumhead taken on line IIa-IIa in FIG. 1A.
Figure 2B:
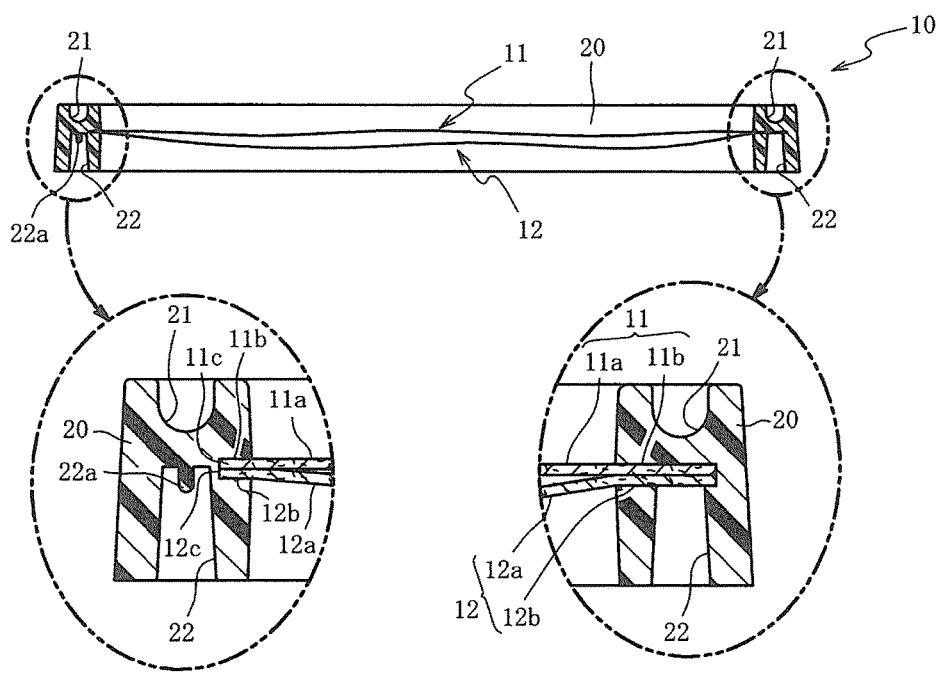
FIG. 2B is a cross-sectional view of the drumhead taken on line IIb-IIb in FIG. 1A.

Preferred embodiments of the present invention are described hereinafter in detail with reference to the accompanying drawings. First, a drumhead 10 according to the first embodiment of the present invention is described with reference to FIGS. 1A, 1B and FIGS. 2A, 2B. FIG. 1A is a top view of the drumhead 10 according to the first embodiment. FIG. 1B is a bottom view of the drumhead 10. FIG. 2A is a cross-sectional view of the drumhead 10 taken on line IIa-IIa in FIG. 1A. FIG. 2B is a cross-sectional view of the drumhead 10 taken on line IIb-IIb in FIG. 1A. Moreover, in FIG. 1B, a shape of an outer periphery 12b of membranes 11 and 12 is schematically illustrated in chain double-dashed lines. In addition, to simplify the drawings to facilitate an understanding of the description, in FIG. 2A and FIG. 2B, shapes of the membranes 11 and 12, pin trace 21a and gate trace 22a are schematically illustrated.

As shown in FIGS. 1A, 1B and FIGS. 2A, 2B, the drumhead 10 is one of members that constitute a later-described drum 100 (see FIG. 3). The drumhead 10 includes the two membranes 11 and 12, and an annular frame 20. The two membranes 11 and 12 are aimed of a stretchable mesh material. The frame 20 is fixed to outer circumferential portions of the two membranes 11 and 12. In addition, the frame 20 is formed of a resin material. Further, the membranes 11, 12 and the frame 20 are integrally formed together by injection molding using a later-described mold 50 (see FIG. 5). A manufacturing method of the drumhead 10 will be described later.

The membranes 11 and 12 include struck head portions 11a and 12a respectively, and outer peripheries 11b and 12b respectively. The struck head portions 11a and 12a are configured as a striking face to be struck by a performer. The outer peripheries 11b and 12b are located on an outer circumferential side of the struck head portions 11a and 12a. The outer peripheries 11b and 12b are fixed on the frame 20 in a state that the struck head portions 11a and 12a are exposed from an inner circumferential side of the frame 20.

The two membranes 11 and 12 are woven by plain weaving or twill weaving and are layered such that their texturing directions intersect obliquely. The outer periphery 12b is fixed on the frame 20 in a state that among the two membranes 11 and 12, the membrane 11 has an outer diameter smaller than that of the membrane 12 and the membrane 12 has greater looseness than the membrane 11.

The membranes 11 and 12 are fixed on the frame 20 in a state that outer edges of the outer peripheries 11b and 12b are disposed on an inside of the frame 20. That is, the membranes 11 and 12 are fixed on the frame 20 in a state that the entirety of the outer peripheries 11b and 12b is disposed on the inside of the frame 20. Therefore, the outer peripheries 11b and 12b may be prevented from protruding from an outer side surface of the molded frame 20. That is, a step of cutting off the outer peripheries 11b and 12b that protrude from the outer side surface of the frame 20 after molding the frame 20 is unnecessary. Accordingly, the manufacturing steps of the drumhead 10 may be decreased. In addition, a trace of cutting-off of the outer peripheries 11b and 12b may be prevented from remaining on the outer side surface of the frame 20. Accordingly, the drumhead 10 may be improved in appearance.

The struck head portions 11a and 12a of the membranes 11 and 12 are formed in a substantially perfect circular shape in a state of being extended without looseness. Thus, in a case where the drumhead 10 is stretched to be installed on an open upper surface side of a shell portion 30 (see FIG. 4A) of the drum 100, tension is evenly imparted to the entirety of the struck head portions 11a and 12a.

The frame 20 has a plurality of depressed upper relief portions 21 and a plurality of depressed lower relief portions 22 respectively on an upper surface side and a lower surface side thereof. Thus, occurrence of sink on the frame 20 after the molding (injection molding) may be suppressed. Here, "sink" refers to a shallow depression formed on a surface of an injection-molded product. Further, time for cooling and solidifying the resin material after the injection molding may be shortened by reducing thickness of the frame 20.

A plurality of the pin traces 21a are formed in the upper relief portion 21 of the frame 20. The pin trace 21a is a remaining trace caused by injection-molding the frame 20 in a state that an upper surface side of the outer peripheries 11b and 12b is held down by a fixing pin 77 (see FIG. 7A) disposed on an upper mold 70 of the mold 50 during molding.

Moreover, on the lower surface side of the frame 20, the lower relief portion 22 is formed at a position corresponding to a position where the pin trace 21a is formed.

In addition, on the lower surface side of the frame 20, the gate trace 22a is formed on an inner wall surface of the lower relief portion 22. The gate trace 22a is formed at a position corresponding to a gate 69 (see FIG. 6A) disposed on a lower mold 60 of the mold 50 during molding. That is, the gate trace 22a is a remaining trace caused by injecting the resin material from the gate 69. Since the gate trace 22a is formed on the inner wall surface of the lower relief portion 22, the gate trace 22a may be made inconspicuous in the appearance of the drumhead 10. Therefore, the drumhead 10 may be improved in appearance.

Further, a locking portion 23 capable of locking a later-described tightening bolt 40 (see FIG. 3) is formed in the frame 20 at six positions equally spaced along a circumferential direction. A bolt hole 24 that allows the tightening bolt 40 to be inserted thereinto is drilled in each locking portion 23. Thus, with respect to the frame 20, it is unnecessary to attach to the frame 20 another member having a bolt hole formed therein. Therefore, a number of members of the drum 100 (see FIG. 3) may be decreased.

The resin material used for the frame 20 is exemplified by an ABS resin or polycarbonate resin or the like. In addition, although in the present embodiment, the locking portion 23 and the bolt hole 24 are formed at six positions, the locking portion 23 and the bolt hole 24 may also be formed at five or fewer positions, or at seven or more positions.

Here, in the membranes 11 and 12, the outer edges of the outer peripheries 11b and 12b are disposed on a further outer circumferential side than a virtual circle VC that passes through centers of a plurality of the bolt holes 24. Thus, it may be ensured that more portions of the outer peripheries 11b and 12b are fixed on the frame 20. Therefore, a fixation strength between the membranes 11, 12 and the frame 20 may be increased.

Further, since a portion within the frame 20 located on a further outer circumferential side than the outer peripheries 11b and 12b includes no membranes 11 and 12 and a vertical bonding strength of the frame 20 becomes strong, the strength of the frame 20 may be increased.

In addition, in the membranes 11 and 12, first cutting-off portions 11c and 12c are formed within the outer peripheries 11b and 12b at positions corresponding to where the gate trace 22a is formed. Further, in the membranes 11 and 12, second cutting-off portions 11d and 12d are formed within the outer peripheries 11b and 12b at positions corresponding to where the bolt hole 24 is formed.

Next, the drum 100 using the drumhead 10 is described with reference to FIG. 3 and FIGS. 4A, 4B. FIG. 3 is a top view of the drum 100. FIG. 4A is a cross-sectional view of the drum 100 taken on line IVa-IVa in FIG. 3. FIG. 4B is a partially enlarged cross-sectional view of the drum 100.

Figure 3:
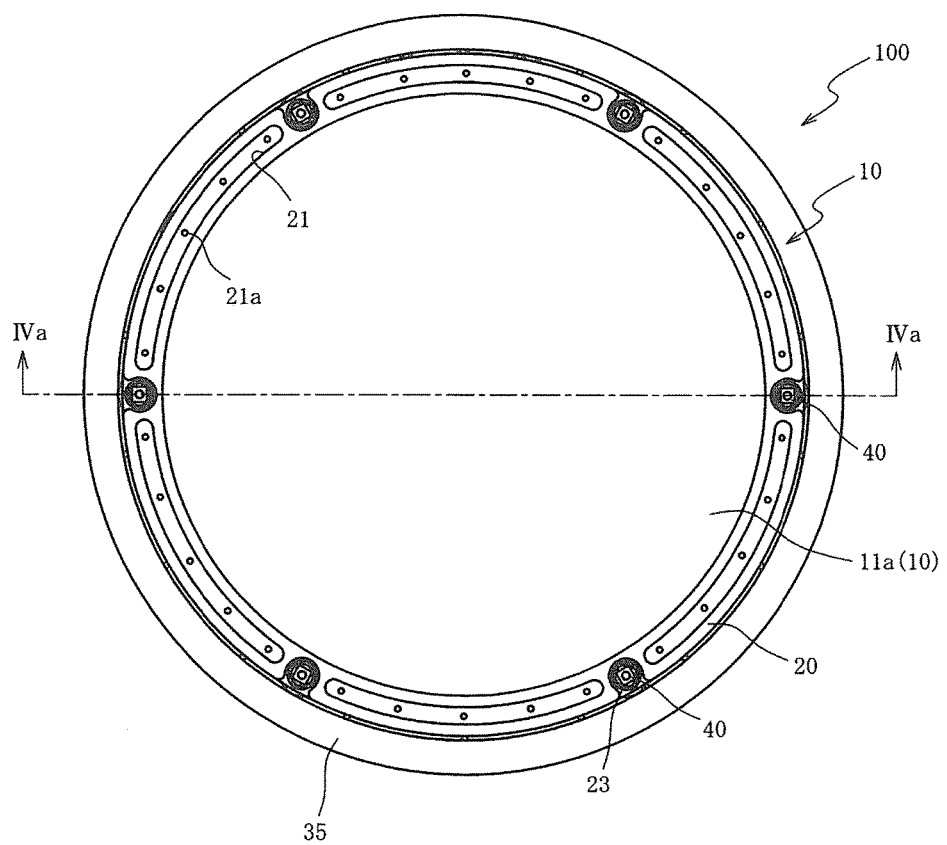
FIG. 3 is a top view of a drum.
Figure 4A:
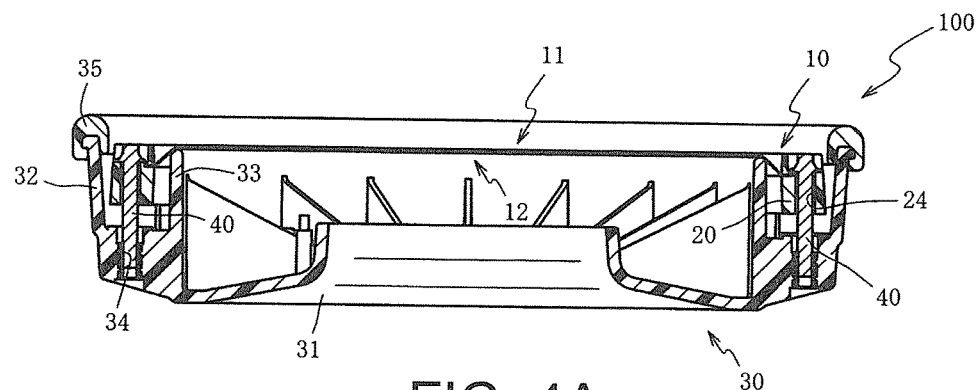
FIG. 4A is a cross-sectional view of the drum taken on line IVa-IVa in FIG. 3.
Figure 4B:
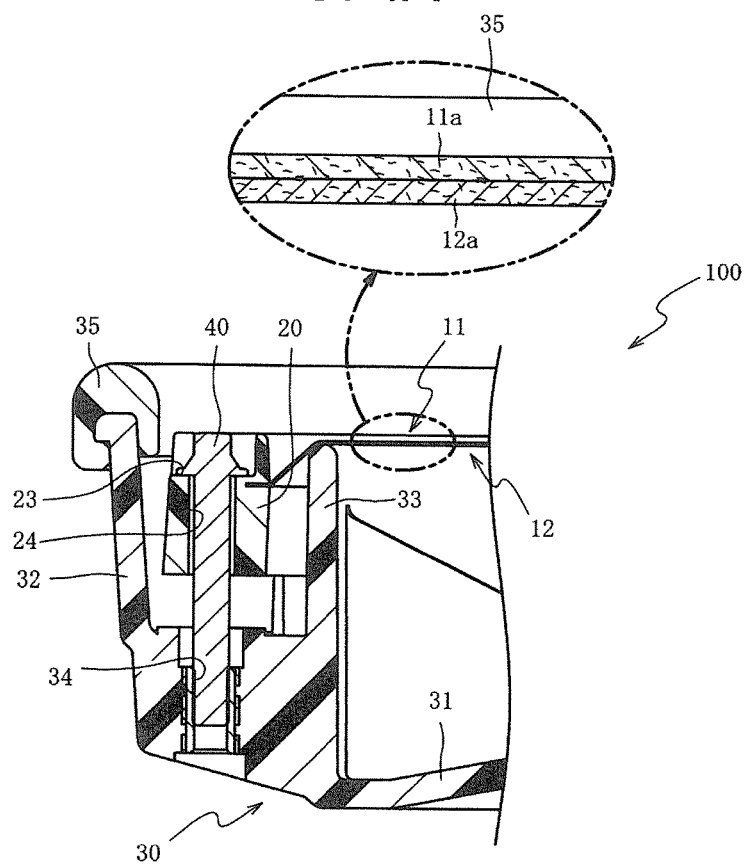
FIG. 4B is a partially enlarged cross-sectional view of the drum.

As shown in FIG. 3 and FIGS. 4A, 4B, the drum 100 is a percussion instrument that simulates an acoustic snare drum. The drum 100 mainly includes the drumhead 10, the shell portion 30 and the tightening bolt 40. The drumhead 10 is stretched to be installed over the shell portion 30. The tightening bolt 40 tightens and fixes the drumhead 10 to the shell portion 30.

The shell portion 30 is a member that forms a framework of the drum 100, and is formed in a substantially hollow cylindrical shape from a resin material. The shell portion 30 mainly includes a bottom 31, an outer circumferential upright portion 32, an inner circumferential upright portion 33 and an internal thread portion 34. The bottom 31 constitutes a bottom surface of the shell portion 30. The outer circumferential upright portion 32 is erected on an outer circumferential edge of the bottom 31, and is formed in a cylindrical shape. The inner circumferential upright portion 33 is erected on the bottom 31 on an inner side of the outer circumferential upright portion 32, and is formed in a cylindrical shape. The internal thread portion 34 is formed between the outer circumferential upright portion 32 and the inner circumferential upright portion 33.

The outer circumferential upright portion 32 is a part that constitutes a side wall of the shell portion 30. An upper end of the outer circumferential upright portion 32 is configured as a rim portion to be struck when the performer performs a rim shot. Moreover, a rim cover 35 formed of a rubbery elastic body covers upon the upper end of the outer circumferential upright portion 32. When the performer performs a rim shot, the rim cover 35 covering upon the upper end of the outer circumferential upright portion 32 is struck. Therefore, the shell portion 30 may be prevented from damage due to an impact caused by the striking.

The inner circumferential upright portion 33 is a part that supports the struck head portions 11a and 12a of the membranes 11 and 12. The inner circumferential upright portion 33 has an outer diameter smaller than an inner diameter of the frame 20. An upper end of the inner circumferential upright portion 33 is located lower than the upper end of the outer circumferential upright portion 32.

The internal thread portion 34 is a part to which the tightening bolt 40 is screw-connected. The internal thread portion 34 is formed at six positions equally spaced along a circumferential direction of the shell portion 30. An internal thread that allows the tightening bolt 40 to be screwed thereinto is disposed on an inner circumferential surface of a hole drilled in the shell portion 30 along a vertical direction (vertical direction in FIG. 4A).

The tightening bolt 40 is a member for imparting tension to the struck head portions 11a and 12a of the membranes 11 and 12 by being screw-connected to the internal thread portion 34. The tightening bolt 40 is formed lockable by the locking portion 23 of the frame 20.

The tightening bolt 40 is screw-connected to the internal thread portion 34 in a state of being inserted into the bolt hole 24 of the frame 20 of the drumhead 10 and locked by the locking portion 23. Thus, when the frame 20 is pressed down, the mesh material that composes the struck head portions 11a and 12a is expanded to impart tension to the struck head portions 11a and 12a.

Here, the outer periphery 12b of the membrane 12 is fixed on the frame 20 in a state that the struck head portion 12a has greater looseness than the struck head portion 11a of the membrane 11. Therefore, in the state that the drumhead 10 is stretched to be installed over the shell portion 30, the tension imparted to the struck head portion 11a of the membrane 11 may be made different from that imparted to the struck head portion 12a of the membrane 12.

Accordingly, when the struck head portions 11a and 12a are struck, vibration generated on the struck head portion 11a of the membrane 11 is different from that generated on the struck head portion 12a of the membrane 12. At this moment, the vibration of the struck head portion 11a of the membrane 11 and the vibration of the struck head portion 12a of the membrane 12 cancel each other. Thus, the vibration of the struck head portions 11a and 12a may be attenuated early. That is, a percussive sound generated by the striking to the struck head portions 11a and 12a may be reduced.

Moreover, in the present embodiment, a difference between the inner diameter of the frame 20 and the outer diameter of the inner circumferential upright portion 33 or a height from the membrane 11 to the upper surface of the frame 20 is set such that, in a state that the frame 20 is pushed down to apply appropriate tension to the membrane 11, the upper surface of the frame 20 is located substantially coplanar with the membrane 11 stretched to be installed over the inner circumferential upright portion 33.

Here, a drumhead of the conventional drum is manufactured following a manufacturing method of a drumhead of an acoustic drum having a struck head portion formed of a film. That is, a drumhead having a metallic head frame fixed to an outer edge of a membrane, and an annular hoop having a locking portion and a bolt hole formed therein, are separately formed. The struck head portion of the drumhead is placed on the open upper surface side of the shell portion 30, and tension is imparted to the struck head portion by pressing an outer periphery of the drumhead through the head frame using the annular hoop.

By contrast, in the drumhead 10 according to the present embodiment, the frame 20 has the locking portion 23 and the bolt hole 24 formed therein. Accordingly, the frame 20 serves as both the head frame and the hoop in the conventional drum. That is, since the hoop is integrally formed with the frame 20, the number of members of the drum 100 may be decreased.

In addition, the conventional drumhead is manufactured by fixing an outer circumferential portion of the membrane to the metallic head frame by swaging while the outer circumferential portion of the membrane is wrapped around an iron core. By contrast, in the present embodiment, the frame 20 is formed of a resin material, and the outer peripheries 11b and 12b of the membranes 11 and 12 are fixed on the frame 20 in molding the frame 20. Thus, the drumhead 10 having the struck head portions 11a, 12a and the frame 20 integrally formed together is manufactured.

In this manner, compared to the conventional drumhead, the manufacturing process of the drumhead 10 may be simplified, and the manufacturing costs thereof may be kept down. Therefore, the manufacturing costs of the drumhead 10 and the drum 100 using the drumhead 10 may be kept down.

Figure 5:
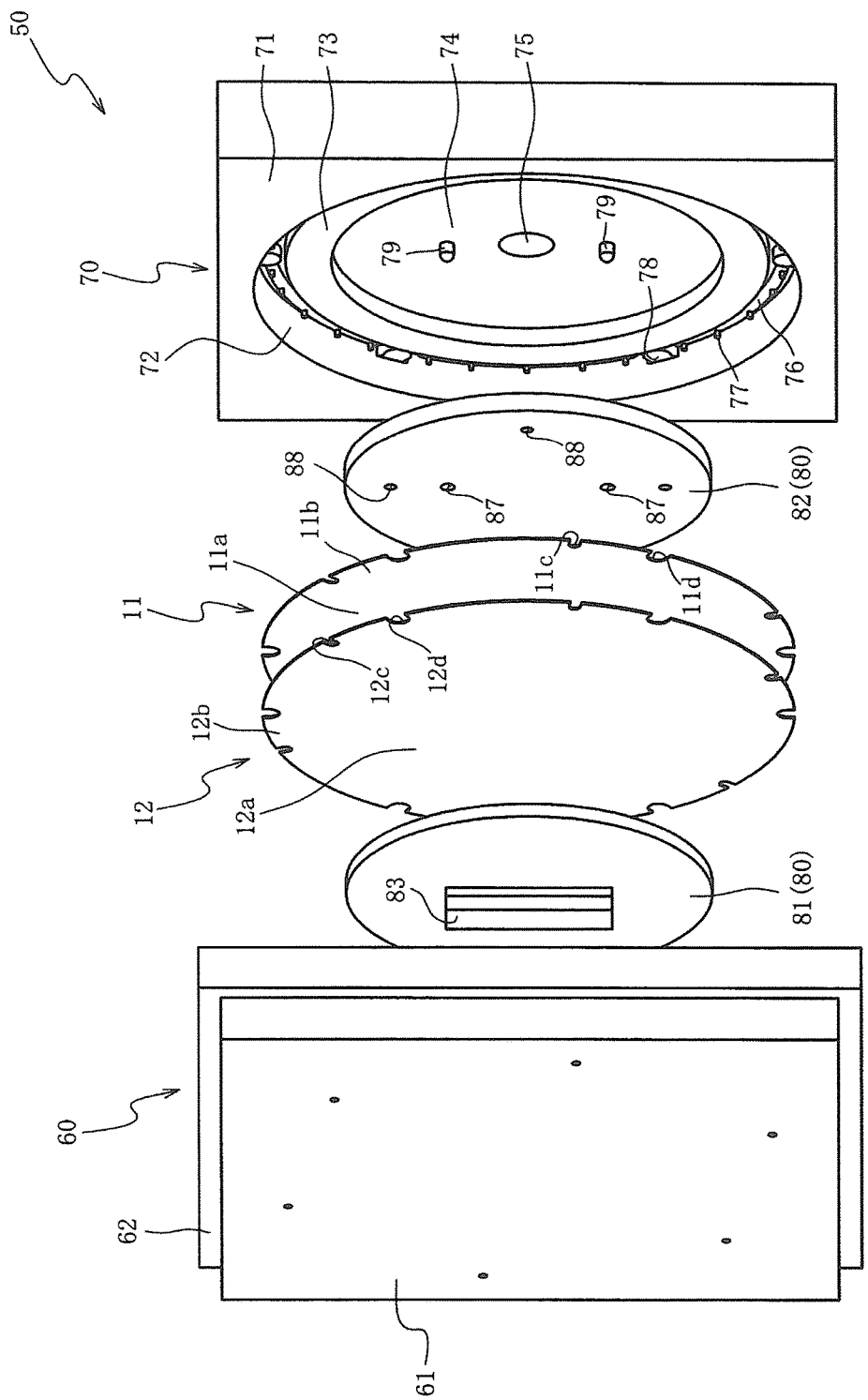
FIG. 5 is an exploded perspective view of a mold.

Next, the manufacturing method of the drumhead 10 using the mold 50 is described with reference to FIG. 5 to FIG. 9. First, an entire structure of the mold 50 is described with reference to FIG. 5. FIG. 5 is an exploded perspective view of the mold 50.

As shown in FIG. 5, the mold 50 includes the lower mold 60 and the upper mold 70 closed vertically, and a pair of holding members 80. The pair of the holding members 80 is a member capable of being accommodated within the lower mold 60 and the upper mold 70.

The pair of the holding members 80 is a jig for accommodating the two membranes 11 and 12 within the lower mold 60 and the upper mold 70 while fixing the membranes 11 and 12. The pair of the holding members 80 includes a lower holding member 81 and an upper holding member 82 respectively disposed on the side of the lower mold 60 and on the side of the upper mold 70. A detailed configuration of the pair of the holding members 80 will be described later.

The drumhead 10 is integrally formed by the following way: in molding the frame 20, the outer peripheries 11b and 12b of the two membranes 11 and 12 are fixed on the frame 20 with the struck head portions 11a and 12a exposed. In a state that the two membranes 11 and 12 of the drumhead 10 are disposed between the lower mold 60 and the upper mold 70, the mold 50 is closed. At this moment, the struck head portions 11a and 12a are held and fixed by the pair of the holding members 80. Further, the outer peripheries 11b and 12b of the membranes 11 and 12 exposed from an outer circumferential side of the pair of the holding members 80 are disposed within a cavity CA (see FIG. 9) of the mold 50.

Then, a heat-melted resin material is injected into the cavity CA. Further, the injected resin material is cooled and solidified. In this manner, the outer peripheries 11b and 12b are fixed on the frame 20, and thus the drumhead 10 having the struck head portions 11a, 12a and the frame 20 integrally formed together is manufactured. The details are described hereinafter.

Figure 6A:
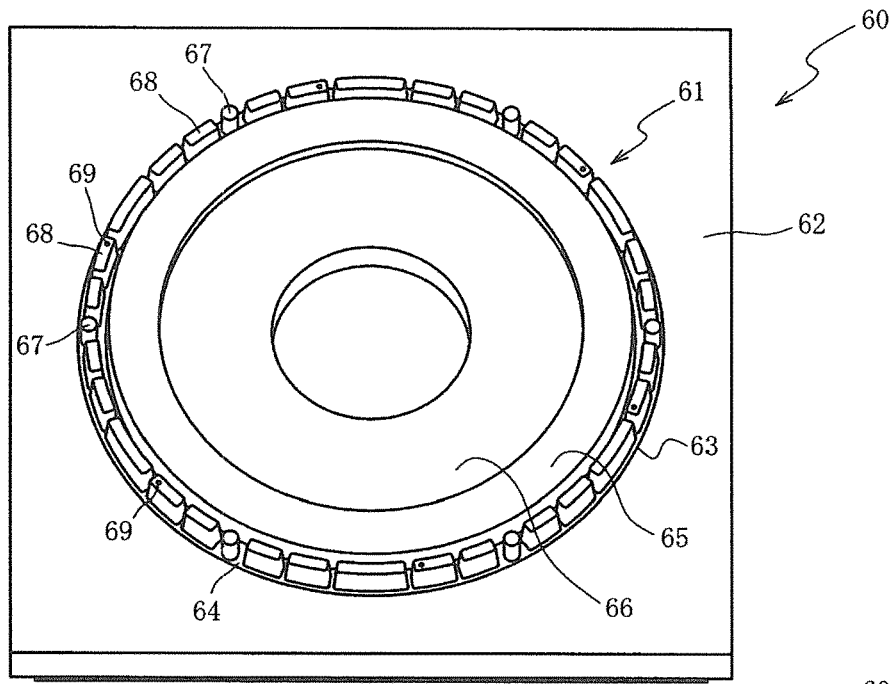
FIG. 6A is a perspective view of a lower mold.
Figure 6B:
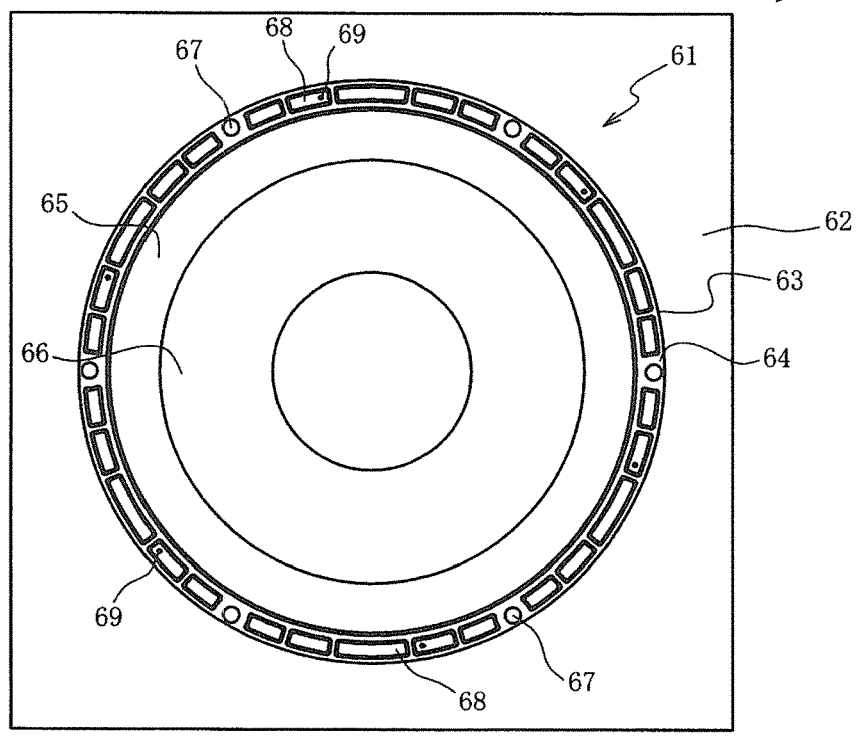
FIG. 6B is a top view of the lower mold.

Next, the lower mold 60 is described with reference to FIGS. 6A, 6B. FIG. 6A is a perspective view of the lower mold 60. FIG. 6B is a top view of the lower mold 60.

As shown in FIGS. 6A, 6B, the lower mold 60 includes a lower main body 61 and an ejecting body 62. The ejecting body 62 is detachably fitted to the lower main body 61.

The lower main body 61 is formed in a substantially square shape as viewed from its upper surface side (paper front side in FIG. 6B). The lower main body 61 includes an ejecting body accommodating portion 63, a lower cavity forming portion 64, a lower clamping portion 65 and a lower holding member accommodating portion 66. The ejecting body accommodating portion 63 is located on an outer edge of the lower main body 61. The lower cavity forming portion 64 is formed in an annular shape as viewed from above on an inner circumferential side of the ejecting body accommodating portion 63. The lower clamping portion 65 is formed projected upward on an inner circumferential side of the lower cavity forming portion 64. The lower holding member accommodating portion 66 is formed depressed downward on an inner circumferential side of the lower clamping portion 65.

The ejecting body accommodating portion 63 is a part that accommodates the ejecting body 62. An outer side surface of the ejecting body accommodating portion 63 connected with the lower cavity forming portion 64 is formed in a tapered shape decreasing in diameter upward (toward the paper front side in FIG. 6B).

The lower cavity forming portion 64 is a part that constitutes a portion of the cavity CA (see FIG. 9) when the lower mold 60 and the upper mold 70 are closed. A plurality of bolt hole forming portions 67 and a plurality of lower relief forming portions 68 are respectively formed projected on the lower cavity forming portion 64. The plurality of the bolt hole forming portions 67 are installed adjacent to one another in an equally spaced manner along a circumferential direction. The plurality of the lower relief forming portions 68 are installed adjacent to one another between the plurality of the bolt hole forming portions 67.

The bolt hole forming portion 67 is a part for forming the bolt hole 24 (see FIG. 1A) in the frame 20. In the present embodiment, six bolt hole forming portions 67 are formed.

The lower relief forming portion 68 is a part for forming the lower relief portion 22 (see FIG. 1B) in the frame 20. In the present embodiment, five lower relief forming portions 68 are formed between two adjacent bolt hole forming portions 67.

In addition, in one of the five lower relief forming portions 68 formed between two adjacent bolt hole forming portions 67, the gate 69 is formed open upward. The gate 69 is a gate for injecting the resin material into the cavity CA during injection molding.

The lower clamping portion 65 is a part for fixing outer edges of the struck head portions 11a and 12a of the membranes 11 and 12 from a lower surface side in closing the mold 50. A height position of an upper end surface of the lower clamping portion 65 from the lower cavity forming portion 64 is set almost equal to height positions of upper end surfaces of the bolt hole forming portion 67 and the lower relief forming portion 68 from the lower cavity forming portion 64.

Figure 8A:
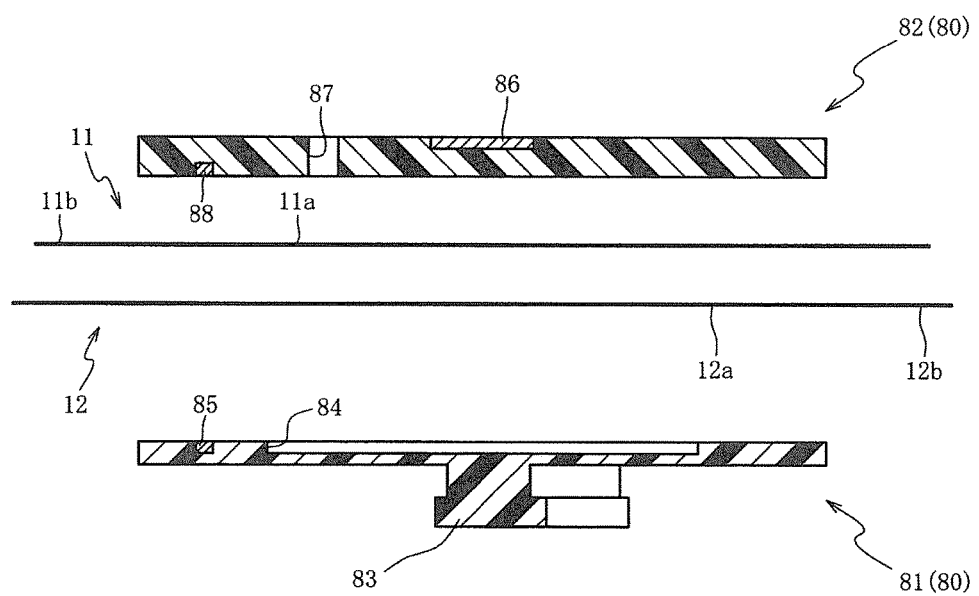
FIG. 8A is a cross-sectional view of a pair of holding members.

The lower holding member accommodating portion 66 is a part that accommodates the lower holding member 81 (see FIG. 8A). The lower holding member accommodating portion 66 has a depth (length in a direction perpendicular to the paper surface of FIG. 6B) and an inner diameter greater than a height (length in the vertical direction in FIG. 8A) and an outer diameter (length in the horizontal direction in FIG. 8A) of the lower holding member 81.

The ejecting body 62 is a member used in releasing the injection-molded frame 20 from the mold. The ejecting body 62 has an appearance formed in a substantially square shape larger than the lower main body 61. Further, a through hole 62a having a circular shape as viewed from above is formed open at a central portion of the ejecting body 62.

The through hole 62a is formed in a tapered shape with its inner diameter decreasing upward. A part within the lower main body 61 located on a further inner circumferential side than the ejecting body accommodating portion 63 is configured to be fitted into the through hole 62a. In addition, the inner diameter of the through hole 62a in an upper end surface of the ejecting body 62 is smaller than an outer diameter of the frame 20 (see FIG. 1B). Further, the upper end surface of the ejecting body 62 is formed to flush with the lower cavity forming portion 64 in a state of being fitted to the lower main body 61.

Figure 7A:
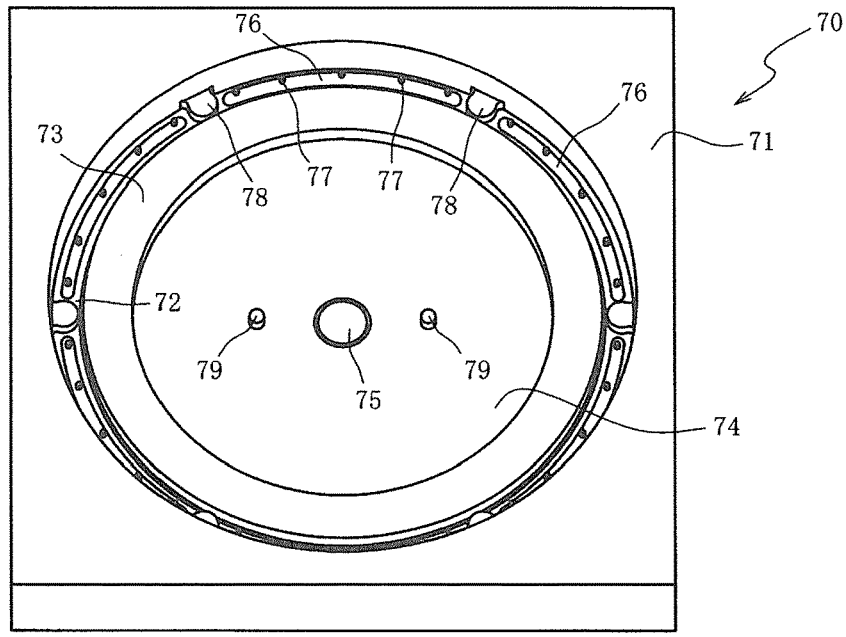
FIG. 7A is a perspective view of an upper mold.
Figure 7B:
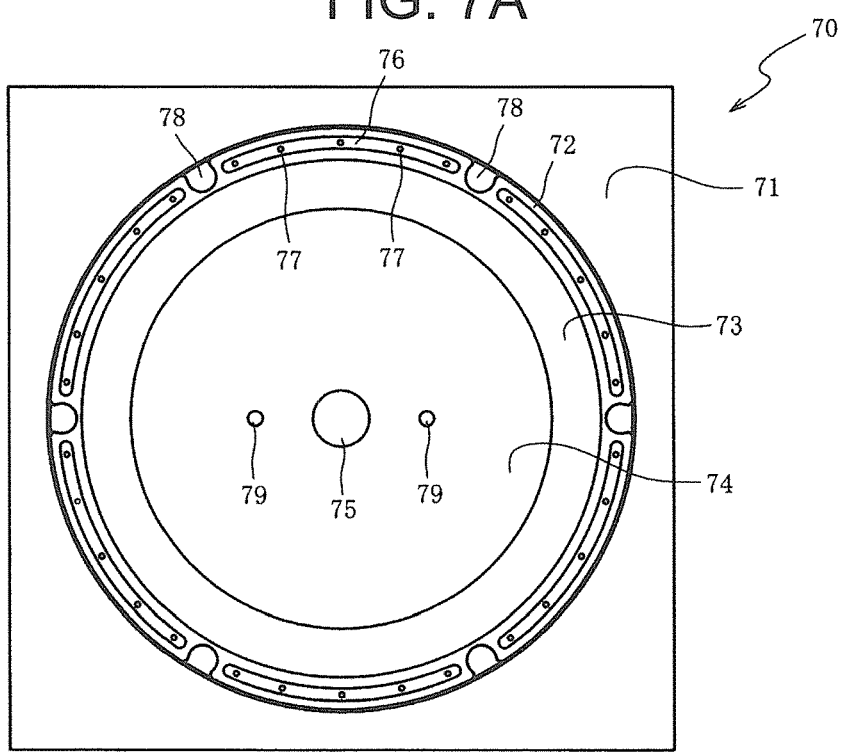
FIG. 7B is a bottom view of the upper mold.

Next, the upper mold 70 is described with reference to FIGS. 7A, 7B. FIG. 7A is a perspective view of the upper mold 70. FIG. 7B is a bottom view of the upper mold 70.

As shown in FIGS. 7A, 7B, the upper mold 70 has an appearance formed in a substantially square shape as viewed from a lower surface side (paper front side in FIG. 7B). The upper mold 70 includes an ejecting body facing surface 71, an upper cavity forming portion 72, an upper clamping portion 73, an upper holding member accommodating portion 74 and an electromagnet 75. The ejecting body facing surface 71 is located on an outer edge on the lower surface side of the upper mold 70. The upper cavity framing portion 72 is formed depressed upward in an annular shape as viewed from below on an inner circumferential side of the ejecting body facing surface 71. The upper clamping portion 73 is formed projected downward in an annular shape as viewed from below on an inner circumferential side of the upper cavity forming portion 72. The upper holding member accommodating portion 74 is formed depressed upward in a circular shape as viewed from below on an inner circumferential side of the upper clamping portion 73. The electromagnet 75 is buried in a central portion of the upper holding member accommodating portion 74.

The ejecting body facing surface 71 is a part that touches the upper end surface of the ejecting body 62 (see FIG. 6B) during closing of the mold 50. The ejecting body facing surface 71 has an inner diameter greater than the inner diameter of the through hole 62a in the upper end surface of the ejecting body 62.

The upper cavity forming portion 72 is a part that constitutes a portion of the cavity CA (see FIG. 9) during closing of the mold 50. The upper cavity forming portion 72 includes a plurality of upper relief forming portions 76, the fixing pins 77 and locking portion forming portions 78. The plurality of the upper relief forming portions 76 are formed projected downward from a lower surface of the upper cavity forming portion 72 while extending along a circumferential direction. The fixing pin 77 protrudes downward from a lower end surface of the upper relief forming portion 76. The locking portion forming portion 78 is located between the plurality of the upper relief forming portions 76 and formed projected downward from the lower surface of the upper cavity forming portion 72.

The upper relief forming portion 76 is a part for forming the upper relief portion 21 (see FIG. 1A) in the frame 20. In the present embodiment, six upper relief forming portions 76 having an arc shape as viewed from below are formed.

The fixing pin 77 is a part that holds down the membranes 11 and 12 from the upper surface side of the outer peripheries 11b and 12b during closing of the mold 50. In the present embodiment, with respect to one upper relief forming portion 76, five fixing pins 77 are formed protruding along the circumferential direction. Moreover, the fixing pin 77 is disposed at a position corresponding to the lower relief forming portion 68 of the lower mold 60.

The locking portion forming portion 78 is a part for forming the locking portion 23 (see FIG. 1A) in the upper surface of the frame 20. The locking portion forming portion 78 is disposed at a position corresponding to the bolt hole forming portion 67 of the lower mold 60.

The upper clamping portion 73 is a part for fixing the membranes 11 and 12 from an upper surface side of the outer edges of the struck head portions 11a and 12a during closing of the mold 50. The upper clamping portion 73 has an outer diameter and an inner diameter substantially equal to those of the lower clamping portion 65 (see FIG. 6B).

The upper holding member accommodating portion 74 is a part that accommodates the upper holding member 82 (see FIG. 5). The upper holding member accommodating portion 74 has an inner diameter greater than an outer diameter of the upper holding member 82. Thus, a gap is formed between an inner circumferential surface of the upper holding member accommodating portion 74 and an outer circumferential surface of the upper holding member 82. Moreover, two positioning pins 79 are formed protruding on two sides having the electromagnet 75 therebetween on the upper holding member accommodating portion 74.

Figure 8B:
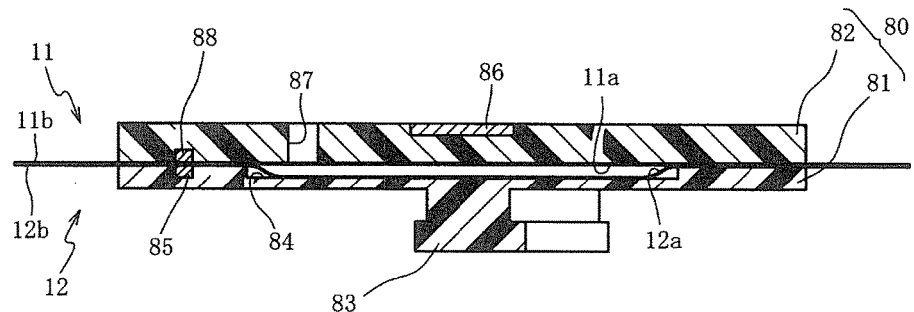
FIG. 8B is a cross-sectional view of the pair of the holding members.

Next, the pair of the holding members 80 is described with reference to FIGS. 8A, 8B. FIG. 8A and FIG. 8B are cross-sectional views of the pair of the holding members 80. FIG. 8A illustrates the pair of the holding members 80 in a state before holding and fixing the pair of the membranes 11 and 12. Meanwhile, FIG. 8B illustrates the pair of the holding members 80 in the state of holding and fixing the pair of the membranes 11 and 12. Moreover, FIG. 8A and FIG. 8B illustrate the cross section corresponding to the later-described FIG. 9.

As shown in FIG. 8A, the lower holding member 81 and the upper holding member 82 of the pair of the holding members 80 are formed of a resin material having low thermal conductivity. Thus, heat transfer from the lower mold 60 and the upper mold 70 to the membranes 11 and 12 is suppressed, and thermal shrinkage of the membranes 11 and 12 during molding may be prevented. Moreover, in the present embodiment, the pair of the holding members 80 is constituted by bakelite plates.

The lower holding member 81 includes a handle portion 83, a membrane accommodating portion 84 and a plurality of lower magnets 85. The handle portion 83 is formed projected on a lower surface side (wherein "lower" means the lower surface side in FIG. 8A) of the lower holding member 81. The membrane accommodating portion 84 is depressed in a circular shape as viewed from above at a central portion on an upper surface side (wherein "upper" means the upper surface side in FIG. 8A) of the lower holding member 81. The plurality of the lower magnets 85, which are magnetic bodies, are buried on an outer circumferential side of the membrane accommodating portion 84.

The upper holding member 82 includes a first upper magnet 86, a positioning hole 87 and a plurality of second upper magnets 88. The first upper magnet 86, which is a magnetic body, is buried in a central portion on an upper surface side of the upper holding member 82. The positioning hole 87 is formed through two sides having the first upper magnet 86 therebetween. The plurality of the second upper magnets 88, which are magnetic bodies, are buried on a lower surface side of the upper holding member 82.

The first upper magnet 86 is disposed at a position corresponding to the electromagnet 75 (see FIG. 7B) of the upper mold 70. When a current flows through the electromagnet 75 to generate a magnetic force, the first upper magnet 86 is magnetically attached to the electromagnet 75. When the pair of the holding members 80 is accommodated within the lower mold 60 and the upper mold 70, by magnetically attaching the first upper magnet 86 to the electromagnet 75, positioning of the pair of the holding members 80 with respect to the upper mold 70 may be promptly and precisely performed.

The positioning hole 87 is disposed at a position corresponding to the positioning pin 79 (see FIG. 7B) of the upper mold 70. The positioning hole 87 is formed to allow the positioning pin 79 to be inserted thereinto. By inserting the positioning pin 79 into the positioning hole 87, positioning of the upper holding member 82 with respect to the upper mold 70 may be smoothly performed.

The second upper magnet 88 is disposed at a position corresponding to the lower magnet 85 of the lower holding member 81. The second upper magnet 88 and the lower magnet 85 are configured as mutually attracted magnetic bodies. By magnetically attaching the second upper magnet 88 and the lower magnet 85 to each other, the two membranes 11 and 12 may be securely held and fixed by the pair of the holding members 80.

Moreover, in the present embodiment, since the pair of the holding members 80 is capable of being fixed to the mold 50 by the electromagnet 75, the mold 50 may be used in an erected state (see FIG. 5).

Next, a step of holding and fixing the two membranes 11 and 12 by the pair of the holding members 80 is described.

First, a plurality of the first cutting-off portions 11c and 12c and the second cutting-off portions 11d and 12d are formed in the outer peripheries 11b and 12b of the two membranes 11 and 12 (see FIG. 5).

The first cutting-off portion 11c and the second cutting-off portion 11d of the membrane 11 are formed at positions respectively corresponding to the first cutting-off portion 12c and the second cutting-off portion 12d of the membrane 12. The two membranes 11 and 12 are superimposed such that the first cutting-off portion 11c and the second cutting-off portion 11d of the membrane 11 coincide with the first cutting-off portion 12c and the second cutting-off portion 12d of the membrane 12. Thus, the two membranes 11 and 12 may be precisely and promptly superimposed. Moreover, by superimposing the two membranes 11 and 12 in such manner, the texturing directions of the membranes 11 and 12 obliquely intersect each other.

Next, as shown in FIG. 8B, by means of a jig (not illustrated), central portions (central portions of portions that constitute the struck head portions 11a and 12a) of the two membranes 11 and 12 superimposed in the above manner are held and fixed by the pair of the holding members 80.

At this moment, the central portions of the membranes 11 and 12 are held and fixed by magnetically attaching the lower magnet 85 and the second upper magnet 88 to each other. Further, the outer circumferential portions (outer edges of the portions that constitute the struck head portions 11a and 12a and portions that constitute the outer peripheries 11b and 12b) of the membranes 11 and 12 are exposed from the outer circumferential side of the pair of the holding members 80.

In the state that the two membranes 11 and 12 are held and fixed by the pair of the holding members 80, the outer circumferential portion of the membrane 11 is maintained in a natural state. "Natural state" refers to a state that the struck head portion 11a has no tension imparted thereto and neither does it have looseness. Meanwhile, the membrane 12 has an outer diameter greater than that of the membrane 11. The outer circumferential portion of the membrane 12 is maintained within a space formed between the membrane accommodating portion 84 of the lower holding member 81 and the lower surface side of the upper holding member 82 in a state that the central portion of the membrane 12 has looseness.

Figure 9:
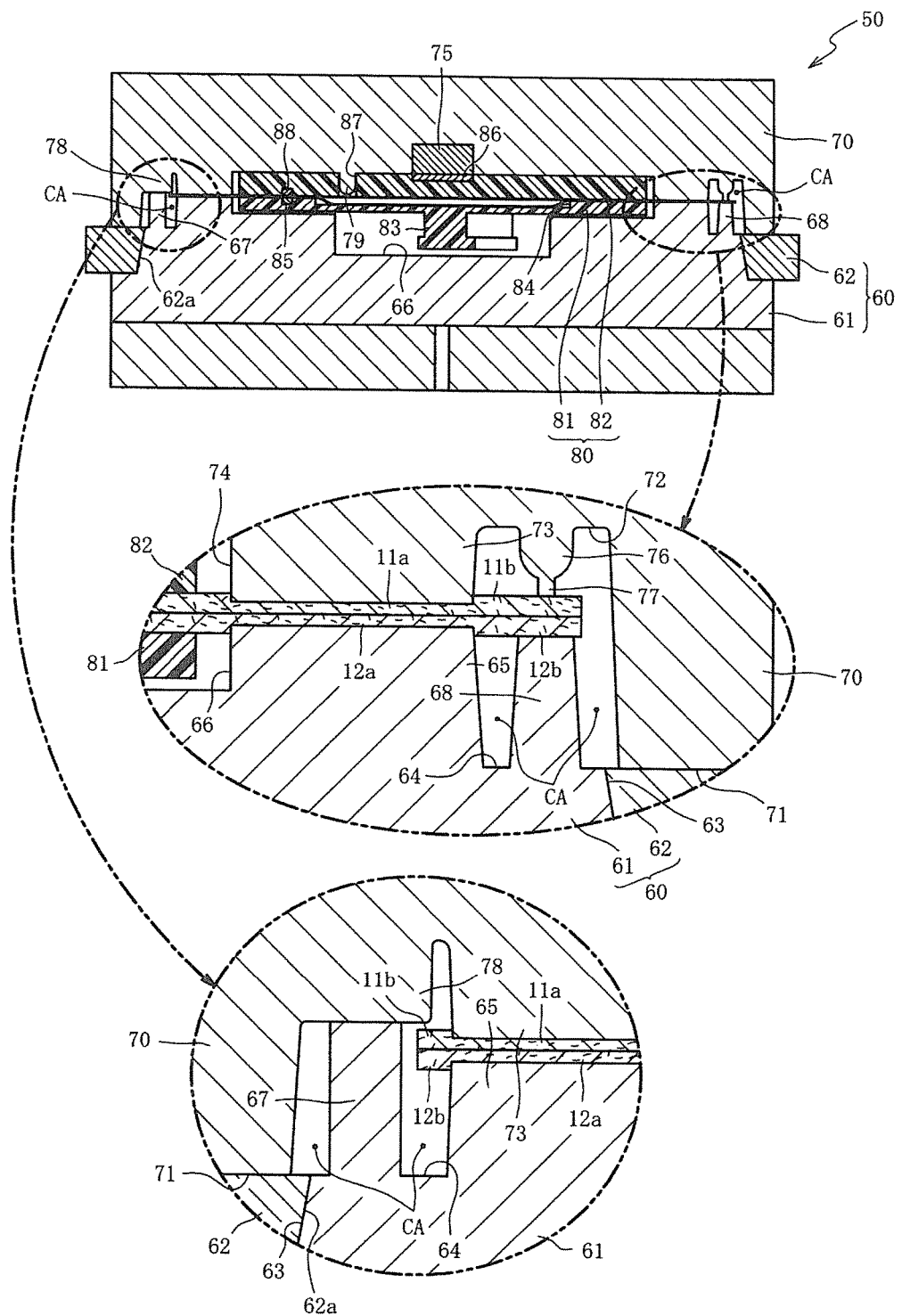
FIG. 9 is a cross-sectional view of the mold.
Figure 10:
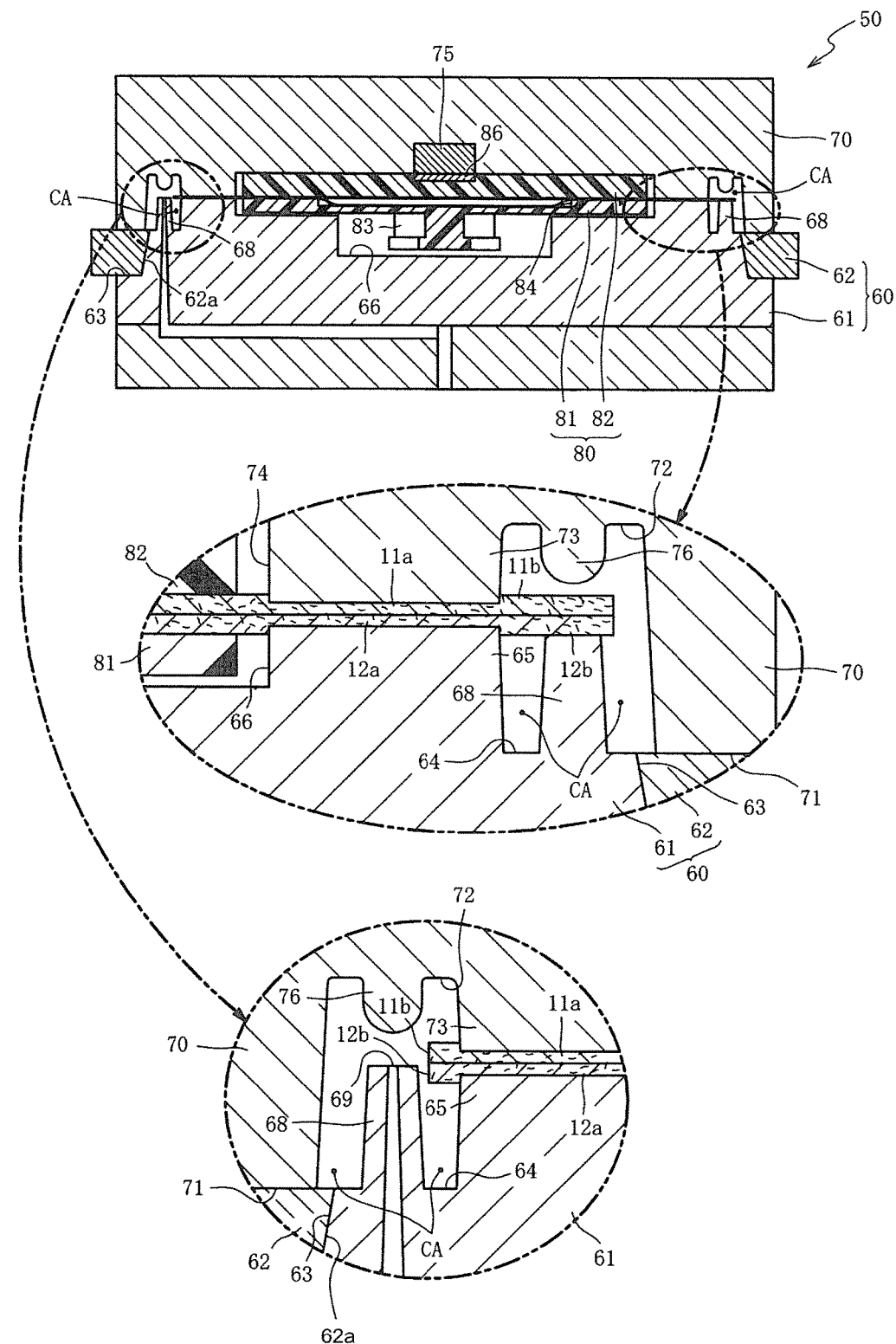
FIG. 10 is a cross-sectional view of the mold.

Next, a step of injection-molding the frame 20 is described with reference to FIG. 9 and FIG. 10. FIG. 9 and FIG. 10 are cross-sectional views of the mold 50. FIG. 9 and FIG. 10 illustrate the mold 50 in the mold-closed state while the pair of the holding members 80 that holds and fixes the membranes 11 and 12 is accommodated within the lower mold 60 and the upper mold 70. Moreover, FIG. 9 illustrates the cross section corresponding to that taken on line IIa-IIa in FIG. 1A. FIG. 10 illustrates the cross section corresponding to that taken on line IIb-IIb in FIG. 1A.

As shown in FIG. 9 and FIG. 10, the pair of the holding members 80 that holds and fixes the membranes 11 and 12 is accommodated within a space formed by the lower holding member accommodating portion 66 of the lower mold 60 and the upper holding member accommodating portion 74 of the upper mold 70.

At this moment, by inserting the positioning pin 79 of the upper mold 70 into the positioning hole 87 of the upper holding member 82, the positioning of the upper holding member 82 with respect to the upper mold 70 may be precisely and promptly performed.

When the electromagnet 75 is caused to generate a magnetic force, the first upper magnet 86 of the upper holding member 82 is magnetically attached to the electromagnet 75. Thus, in the state that the lower mold 60 and the upper mold 70 are closed, a gap may be provided between the lower holding member 81 and an inner wall surface of the lower holding member accommodating portion 66. Therefore, heat transfer from the lower main body 61 to the lower holding member 81 may be suppressed.

Further, the lower holding member 81 and the upper holding member 82 are formed of a resin material having low thermal conductivity. Therefore, heat transfer from the lower mold 60 and the upper mold 70 to the struck head portions 11a and 12a of the membranes 11 and 12 may be further reduced. Also, thermal shrinkage of the struck head portions 11a and 12a due to molding may be suppressed.

When the mold 50 is closed, the cavity CA having an annular shape is formed on the outer circumferential side of the pair of the holding members 80 by the lower cavity forming portion 64, the upper cavity forming portion 72 and the ejecting body 62. The resin material is injected into the cavity CA from the gate 69, and the frame 20 is formed by injection molding.

The outer peripheries 11b and 12b of the membranes 11 and 12 are disposed within the cavity CA. The resin material is injected in the state that the outer peripheries 11b and 12b are disposed within the cavity CA. Thus, the resin material solidifies in the state that the outer peripheries 11b and 12b are buried within the frame 20 (see FIG. 1A), and thereby the outer peripheries 11b and 12b are fixed in the frame 20.

Here, the membranes 11 and 12 in the state of being held and fixed by the pair of the holding members 80 have an outer diameter greater than a diameter of the virtual circle VC (see FIG. 1B) that connects the centers of the plurality of the bolt holes 24. Therefore, outer edges of the membranes 11 and 12 are located on a further outer circumferential side than the bolt hole forming portion 67 and the lower relief forming portion 68. Thus, the outer peripheries 11b and 12b are placed on the upper end surface of the lower relief forming portion 68.

In addition, by disposing the outer edges of the membranes 11 and 12 on a further outer circumferential side than the bolt hole forming portion 67 and the lower relief forming portion 68, it may be ensured that more portions of the outer peripheries 11b and 12b are fixed on the frame 20. Therefore, a fixation strength of the membranes 11 and 12 with respect to the frame 20 may be increased.

Meanwhile, in the state that the membranes 11 and 12 are held and fixed by the pair of the holding members 80, the outer edges of the outer peripheries 11b and 12b are disposed on the inside of the frame 20. Therefore, the outer peripheries 11b and 12b may be prevented from protruding from the outer side surface of the molded frame 20.

That is, the step of cutting off the outer peripheries 11b and 12b that protrude from the outer side surface of the frame 20 after molding is unnecessary. Therefore, the manufacturing steps of the drumhead 10 (see FIG. 1A) may be decreased. In addition, a trace of cutting-off of the outer periphery may be prevented from remaining on the outer side surface of the frame 20. Therefore, the drumhead 10 may be improved in appearance.

In addition, the portion within the frame 20 located on the further outer circumferential side than the outer peripheries 11b and 12b includes no membranes 11 and 12 and the vertical bonding strength of the frame 20 becomes strong. Therefore, the strength of the frame 20 may be increased.

Further, the fixing pin 77 of the upper mold 70 is formed at the position corresponding to the lower relief forming portion 68 of the lower mold 60, and a portion of the outer peripheries 11b and 12b is held and fixed between the fixing pin 77 and the lower relief forming portion 68. Therefore, the outer peripheries 11b and 12b may be fixed within the cavity CA. Thus, the outer peripheries 11b and 12b may be suppressed from being turned up by the force of the resin material injected from the gate 69.

Accordingly, the following may be prevented: the outer peripheries 11b and 12b are fixed on the frame 20 while being turned up, and the outer peripheries 11b and 12b emerge from the upper surface of the molded frame 20.

In addition, the first cutting-off portions 11c and 12c are formed within the outer peripheries 11b and 12b of the membranes 11 and 12 at positions corresponding to arrangement positions of the gate 69 of the lower mold 60.

Therefore, the outer peripheries 11b and 12b may be suppressed from being turned up by the force of the resin material injected from the gate 69. Accordingly, the outer peripheries 11b and 12b may be prevented from being fixed on the upper surface of the molded frame 20 while emerging therefrom.

In this manner, when the resin material is injected from the gate 69, the outer peripheries 11b and 12b may be suppressed from being turned up to emerge from the upper surface of the frame 20. Therefore, the frame 20 may be improved in appearance.

Further, the resin material injected from the gate 69 may be injected to the upper surface side of the outer peripheries 11b and 12b. Therefore, the resin material may be easily spread over to the upper surface side of the outer peripheries 11b and 12b. In addition, the resin material that has entered the upper surface side of the membranes 11 and 12 may flow into a lower surface side of the membranes 11 and 12 through the first cutting-off portions 11c and 12c. Therefore, the resin material may also be sufficiently spread over the lower surface side of the outer peripheries 11b and 12b. As a result, since the resin material is capable of being easily spread throughout the entire cavity CA, defective formation of the frame 20 may be suppressed.

Moreover, when the drum 100 (see FIG. 3) is in use, the upper surface side of the drumhead 10 is easily seen, and in terms of beauty, the appearance of the upper surface side of the drumhead 10 is regarded as important.

Regarding this, in the present embodiment, the gate 69 is formed open toward the side of the upper mold 70, and the resin material injected from the gate 69 may be spread over first to the upper surface side of the outer peripheries 11b and 12b. Therefore, defective formation in the upper surface side of the frame 20 may be further suppressed.

In addition, the gate 69 formed in the lower mold 60 is disposed at a position shifted from the center of the adjacent two bolt hole forming portion 67 towards one side (counterclockwise side in FIG. 6B) in a circumferential direction in a top view of the lower mold 60. Thus, the locking portion 23 and the bolt hole 24 (see FIG. 1A) formed in the frame 20 may prevent occurrence of a weld line. Here, "weld line" refers to a thin line generated at a portion where flows of the resin material injected from adjacent gates 69 join together. As a result, when the tightening bolt 40 (see FIG. 4B) is tightened and fixed, the locking portion 23 may be easily prevented from deformation or damage.

In addition, the locking portion forming portion 78 of the upper mold 70 is formed at a position corresponding to the bolt hole forming portion 67 of the lower mold 60. Therefore, when the mold 50 is closed, the upper end surface of the bolt hole forming portion 67 touches a lower end surface of the locking portion forming portion 78. Thus, the resin material does not enter between the upper end surface of the bolt hole forming portion 67 and the lower end surface of the locking portion forming portion 78. Accordingly, the bolt hole 24 (see FIG. 1A) may be formed through the frame 20 after molding.

Therefore, with respect to the molded frame 20, an operation of forming the bolt hole 24 may be unnecessary. That is, the manufacturing process of the drumhead 10 may be simplified.

In addition, the second cutting-off portions 11d and 12d are formed in the outer peripheries 11b and 12b at the positions corresponding to the bolt hole forming portion 67. Accordingly, the bolt hole 24 formed in the frame 20 after molding may be prevented from being blocked by the outer peripheries 11b and 12b.

Therefore, an operation of cutting off the outer peripheries 11b and 12b that block the bolt hole 24 after molding the frame 20 is unnecessary. That is, the manufacturing steps of the drumhead 10 may be decreased.

In addition, in the membranes 11 and 12, in the state that the mold 50 is closed, the outer edges of the struck head portions 11a and 12a exposed from the outer circumferential side of the pair of the holding members 80 are clamped by the lower clamping portion 65 and the upper clamping portion 73.

Accordingly, the resin material injected into the cavity CA may be prevented from entering the struck head portions 11a and 12a. Therefore, the drumhead 10 after molding may be improved in appearance.

Moreover, the struck head portion 12a of the membrane 12 is configured in a substantially perfect circular shape. That is, in a case where the struck head portion 12a is cut off and extended without looseness, the membrane 12 is clamped between the lower clamping portion 65 and the upper clamping portion 73 such that the struck head portion 12a has a substantially perfect circular shape.

In addition, it is desired that a temperature increase in the lower clamping portion 65 and the upper clamping portion 73 during molding by the mold 50 be suppressed. Thus, heat transfer to the outer edges of the struck head portions 11a and 12a clamped by the lower clamping portion 65 and the upper clamping portion 73 may be suppressed. As a result, thermal shrinkage of the struck head portions 11a and 12a may be suppressed.

Next, a step of releasing the molded frame 20 from the mold is described. In the release from the mold 50, the ejecting body 62 of the lower mold 60 is removed from the lower main body 61, and meanwhile, the lower surface side of the molded frame 20 is pushed out upward. Thereby, the frame 20 is removed from the lower mold 60.

Here, the through hole 62a having a circular shape as viewed from above is formed at the central portion of the ejecting body 62. Further, the lower main body 61 is configured to be fitted into the through hole 62a. In addition, in the state that the ejecting body 62 is fitted to the lower main body 61, the upper end surface of the ejecting body 62 is formed to flush with the lower cavity forming portion 64. Further, in the state that the mold 50 is closed, an inner circumferential edge portion in the upper end surface of the ejecting body 62 forms a portion of the cavity CA. Therefore, when the frame 20 is released from the lower mold 60, the inner circumferential edge portion in the upper end surface of the ejecting body 62 may touch the frame 20. That is, when the frame 20 is pushed out by the ejecting body 62, it may be ensured that a large area of the ejecting body 62 touches the frame 20. As a result, pressure imparted to the lower mold 60 in association with the pushing-out of the ejecting body 62 is dispersed all over an outer circumferential edge portion in a lower end surface of the molded frame 20.

Therefore, the pressure from the ejecting body 62 to the frame 20 may be prevented from being imparted in a locally concentrated manner. Accordingly, deformation of the frame 20 after molding due to pushing-out pressure from the ejecting body 62 may be suppressed.

Moreover, in the membrane 11, the outer circumferential portion is held and fixed by the pair of the holding members 80 in the natural state with no tension imparted thereto and no looseness present before the molding. However, because the injection-molded frame 20 shrinks when released from the mold and cooled, the inner diameter of the frame 20 decreases. As a result, the membrane 11 has the outer periphery 11b fixed on the frame 20 in a state that the struck head portion 11a has looseness. Further, the membrane 12 has the outer periphery 12b fixed on the frame 20 in the state that the struck head portion 12a has greater looseness than the struck head portion 11a of the membrane 11.

As described above, by using the mold 50, the drumhead 10 having the struck head portions 11a, 12a and the frame 20 integrally formed together may be manufactured. Therefore, compared to the conventional drumhead that has the membrane fixed on the metallic head frame by swaging or has the membrane fixed on the head frame by adhesion, the manufacturing process of the present invention may be simplified.

In addition, the pair of the holding members 80 is configured detachable from the lower mold 60 and the upper mold 70. Therefore, an operation of holding and fixing the membranes 11 and 12 accommodated within the lower mold 60 and the upper mold 70 by the pair of the holding members 80 may be proceeded with concurrently with the injection molding of the frame 20 using the mold 50 in preparation for a subsequent injection molding using the mold 50.

That is, in a case where the pair of the holding members 80 is fixed to the lower mold 60 and the upper mold 70, after injection molding of the lower mold 60 and the upper mold 70 is completed, mold opening is performed to demold the frame 20 of the previously manufactured drumhead 10. Then, the membranes 11 and 12 of the drumhead 10 to be manufactured subsequently are held and fixed by the pair of the holding members 80. In this case, time from completion of the previous injection molding of the frame 20 until a start of the subsequent injection molding of the frame 20 is lengthened.

By contrast, according to the present embodiment, after the previously performed injection molding is completed, the membranes 11, 12 and the frame 20, together with the pair of the holding members 80, are subjected to demolding. Then, by accommodating within the lower mold 60 and the upper mold 70 the pair of the holding members 80 that has held and fixed the membranes 11 and 12 of the drumhead 10 to be manufactured subsequently in advance, the subsequent injection molding of the frame 20 may be started.

Therefore, a molding cycle from completion of a previously performed injection molding until a start of a subsequent injection molding may be shortened. That is, the manufacture of the drumhead 10 may be enhanced in efficiency.

In addition, the pair of the holding members 80 is formed of the resin material having low thermal conductivity. Further, a gap is provided between the inner wall surface of the lower holding member accommodating portion 66 of the lower mold 60 and the lower holding member 81, or between the inner circumferential surface of the upper holding member accommodating portion 74 of the upper mold 70 and the outer circumferential surface of the upper holding member 82. Accordingly, heat transfer from the lower mold 60 and the upper mold 70 to the struck head portions 11a and 12a of the membranes 11 and 12 may be suppressed.

Therefore, thermal shrinkage of the struck head portions 11a and 12a may be suppressed. Accordingly, a bad influence on the sound of the struck head portions 11a and 12a caused by thermal shrinkage may be prevented. Further, the following may be prevented: tension cannot be uniformly imparted to the struck head portions 11a and 12a when the struck head portions 11a and 12a are stretched to be installed over the shell portion 30 (see FIG. 4A) due to reduction in roundness of the struck head portions 11a and 12a.

Moreover, a sensor may also be attached to the drumhead 10. For example, a head sensor is interposed between the two membranes 11 and 12 to detect vibration of the membranes 11 and 12. In addition, a rim sensor is attached to the frame 20 to detect that the frame 20 is struck. Further, a jack is provided in the frame to connect the head sensor and the rim sensor to an external sound source apparatus. In this way, the drum 100 having the drumhead 10 attached thereto may be used as an electronic drum.

Next, the second embodiment is described. The first embodiment has described the case where injection molding is performed in the state that the central portions of the two membranes 11 and 12 are held and fixed by the pair of the holding members 80. However, in the second embodiment, injection molding is performed in a state that a gap is provided between the membrane 11 and a lower mold 260 and an upper mold 270. The same reference numerals denote the same portions as those in the above first embodiment, and descriptions thereof are omitted.

Figure 11A:
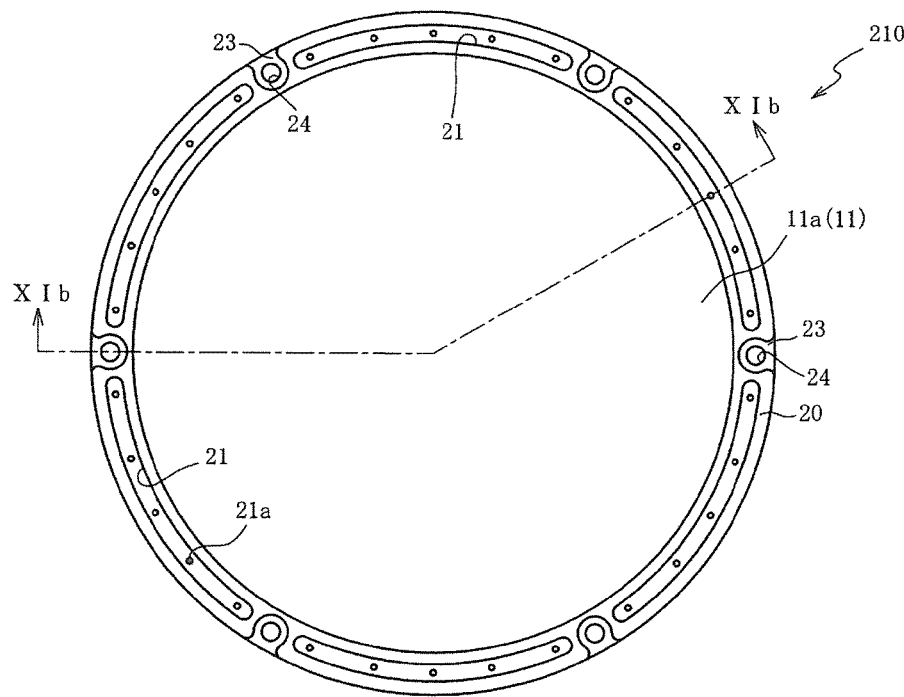
FIG. 11A is a top view of a drumhead according to the second embodiment.
Figure 11B:
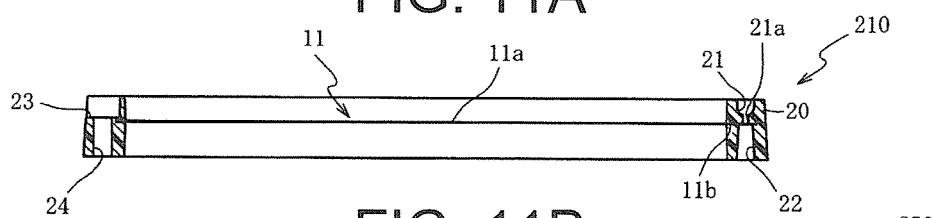
FIG. 11B is a cross-sectional view of the drumhead taken on line XIb-XIb in FIG. 11A.

First, a drumhead 210 according to the second embodiment is described with reference to FIG. 11A and FIG. 11B. FIG. 11A is a top view of the drumhead 210 according to the second embodiment. FIG. 11B is a cross-sectional view of the drumhead 210 taken on line XIb-XIb in FIG. 11A.

As shown in FIG. 11A and FIG. 11B, the drumhead 210 has the struck head portion 11a of the membrane 11 and the frame 20 integrally formed together by fixing the outer periphery 11b on the frame 20. Moreover, except that there is one membrane 11, the drumhead 210 according to the present embodiment has a configuration equivalent to that of the drumhead 10 in the first embodiment.

Figure 11C:
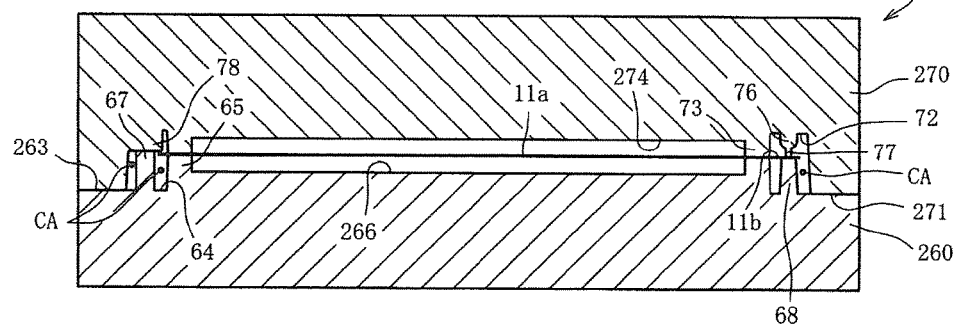
FIG. 11C is a cross-sectional view of a mold.

Next, a mold 250 for the manufacture of the drumhead 210 is described with reference to FIG. 11C. FIG. 11C is a cross-sectional view of the mold 250 and illustrates the cross section corresponding to that in FIG. 11B.

As shown in FIG. 11C, the mold 250 includes a lower mold 260 and an upper mold 270 closed vertically. By performing the closing of the lower mold 260 and the upper mold 270, the cavity CA having an annular shape and serving as a space for injection molding the frame 20 (see FIG. 11B) is formed.

The lower mold 260 includes an outer edge portion 263, the lower cavity forming portion 64, the lower clamping portion 65 and a lower depressed portion 266. The outer edge portion 263 is located on an outer edge of an upper surface side of the lower mold 260. The lower depressed portion 266 is formed depressed downward in a circular shape as viewed from above on an inner circumferential side of the lower clamping portion 65.

The upper mold 270 includes an outer edge portion facing surface 271, the upper cavity forming portion 72, the upper clamping portion 73 and an upper depressed portion 274. The outer edge portion facing surface 271 is located on an outer edge of a lower surface side of the upper mold 270. The outer edge portion facing surface 271 touches the outer edge portion 263 of the lower mold 260 during closing of the mold 250. The upper depressed portion 274 is formed depressed upward in a circular shape as viewed from below on an inner circumferential side of the upper clamping portion 73.

The lower depressed portion 266 of the lower mold 260 and the upper depressed portion 274 of the upper mold 270 are respectively formed at corresponding positions. When the mold 250 is closed, a space is formed between an inner wall surface of the lower depressed portion 266 and an inner wall surface of the upper depressed portion 274.

Therefore, in the state that the mold 250 is closed, the central portion of the membrane 11 is disposed within the space formed between the lower depressed portion 266 and the upper depressed portion 274. A gap is formed between the central portion of the membrane 11 and the lower mold 260 and the upper mold 270. Thus, heat transfer from the lower mold 260 and the upper mold 270 to the struck head portion 11a is suppressed, and thermal shrinkage of the struck head portion 11a may be reduced.

Next, the third embodiment is described with reference to FIG. 12A and FIG. 12B. In the second embodiment, the outer periphery 11b is fixed on the frame 20 in the natural state that the struck head portion 11a has no looseness. By contrast, in the third embodiment, an outer periphery 311b is fixed on the frame 20 in a state that a struck head portion 311a has looseness. The same reference numerals denote the same portions as those in the above embodiments, and descriptions thereof are omitted.

First, a drumhead 310 according to the third embodiment is described with reference to FIG. 12A. FIG. 12A is a cross-sectional view of the drumhead 310 according to the third embodiment and illustrates the cross section corresponding to FIG. 11B.

Figure 12A:
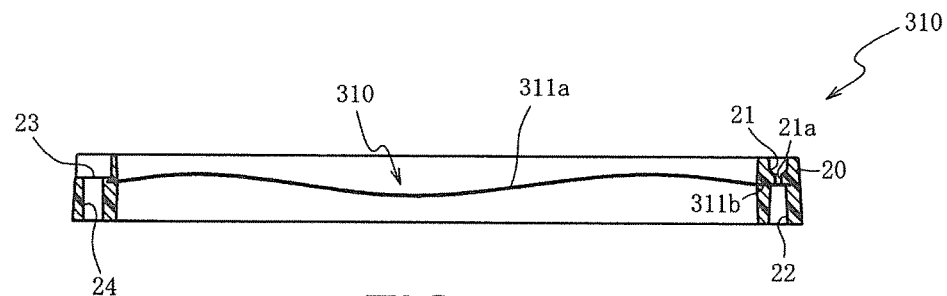
FIG. 12A is a cross-sectional view of a drumhead according to the third embodiment.

As shown in FIG. 12A, the drumhead 310 has the struck head portion 311a of a membrane 311 and the frame 20 integrally formed together by fixing the outer periphery 311b on the frame 20.

The membrane 311 has the outer periphery 311b fixed on the frame 20 in the state that the struck head portion 311a has looseness. Thus, a positional relationship between the struck head portion 311a and the frame 20 in a height direction when the frame 20 is pushed down and the drumhead 310 is stretched to be installed over the inner circumferential upright portion 33 (see FIG. 4B) to impart appropriate tension to the struck head portion 311a may be properly set.

Moreover, except that the struck head portion 311a has looseness, the drumhead 310 according to the present embodiment has a configuration equivalent to that of the drumhead 210 in the second embodiment.

Next, a mold 350 for the manufacture of the drumhead 310 is described with reference to FIG. 12B. FIG. 12B is a cross-sectional view of the mold 350 and illustrates the cross section corresponding to that shown in FIG. 11C.

Figure 12B:
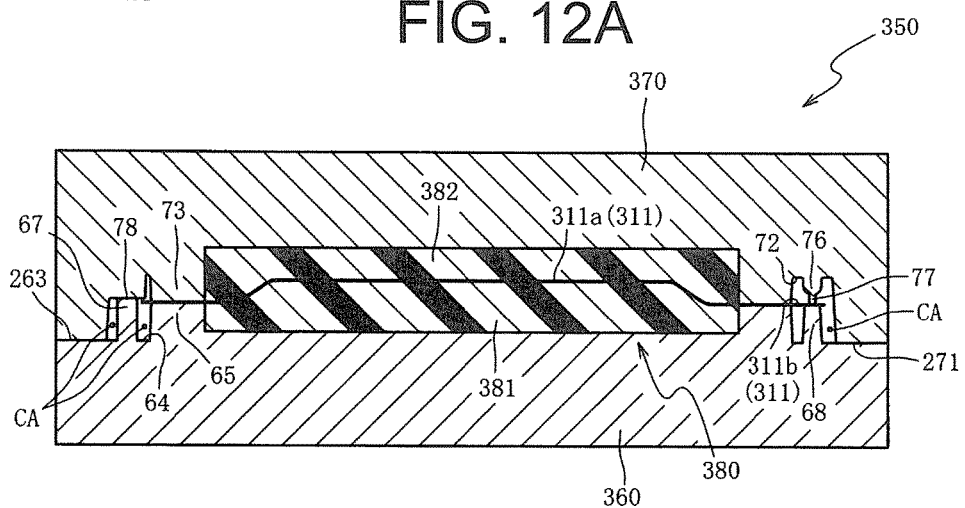
FIG. 12B is a cross-sectional view of a mold according to the third embodiment.

As shown in FIG. 12B, the mold 350 includes a lower mold 360 and an upper mold 370 closed vertically, and a pair of holding members 380. The pair of the holding members 380 is accommodated within the lower mold 360 and the upper mold 370.

The pair of the holding members 380 is formed of a resin material having low thermal conductivity. The pair of the holding members 380 includes a lower holding member 381 and an upper holding member 382. The lower holding member 381 is accommodated on a central portion of an upper surface (wherein "upper" means the upper side in FIG. 12B) of the lower mold 360. The upper holding member 382 is accommodated on a central portion of a lower surface (wherein "lower" means the lower side in FIG. 12B) of the upper mold 370.

A central portion of an upper surface of the lower holding member 381 protrudes further upward than the upper end surface of the lower clamping portion 65 to form a circular truncated cone shape.

In the upper holding member 382, its lower surface is formed capable of being fitted to the upper surface of the lower holding member 381. A central portion of an upper surface of the upper holding member 382 is recessed further upward than a lower end surface of the upper clamping portion 73.

Moreover, the lower magnet 85 (not illustrated) is buried on the upper surface side of the lower holding member 381. The second upper magnet 88 (not illustrated) is buried on the lower surface side of the upper holding member 382. Further, the lower magnet 85 and the second upper magnet 88 are configured as mutually attracted magnetic bodies.

When the mold 350 is closed, a central portion of the membrane 311 is held and fixed while being deformed along a shape of a fitting surface (upper surface of the lower holding member 381, lower surface of the upper holding member 382) of the pair of the holding members 380. In this state, the outer periphery 311b is fixed on the frame 20 by injecting a heat-melted resin material into the cavity CA.

Thus, the outer periphery 311b of the membrane 311 is fixed on the frame 20 in a state that the central portion of the membrane 311, namely, a part that constitutes the struck head portion 311a, has looseness. Accordingly, when the frame 20 is released from the lower mold 360 and the upper mold 370 to release the holding and fixing of the struck head portion 311a from the pair of the holding members 380, the drumhead 310 having looseness in the struck head portion 311a is manufactured.

In this manner, by fixing the outer periphery 311b on the frame 20 in the state that the central portion of the membrane 311 is held and fixed by the pair of the holding members 380, the struck head portion 311a of the drumhead 310 is made to have looseness. Therefore, when the drumhead 310 is fixed to the shell portion 30 (see FIG. 4A), the positional relationship between the struck head portion 311a and the frame 20 in the height direction when the drumhead 310 is stretched to be installed over the shell portion 30 to impart appropriate tension to the struck head portion 311a may be properly set.

Next, the fourth embodiment is described with reference to FIG. 12C. The third embodiment has described the case where a central portion of the fitting surface of the pair of the holding members 380 protrudes upward in a circular truncated cone shape. However, in the fourth embodiment, a central portion of a fitting surface of a pair of holding members 480 protrudes upward in a dome shape. The same reference numerals denote the same portions as those in the above embodiments, and descriptions thereof are omitted.

Figure 12C:
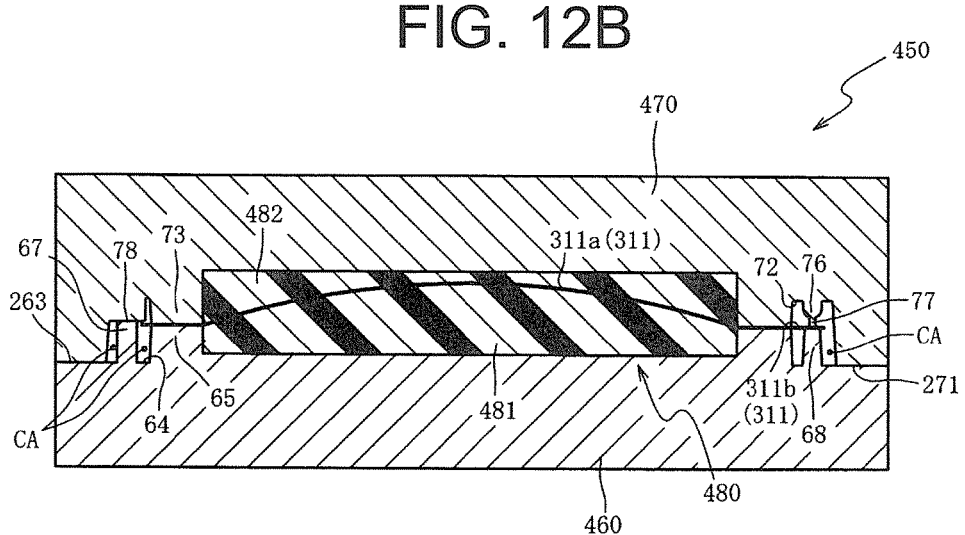
FIG. 12C is a cross-sectional view of a mold according to the fourth embodiment.

FIG. 12C is a cross-sectional view of a mold 450 according to the fourth embodiment and illustrates the cross section corresponding to that shown in FIG. 12B.

As shown in FIG. 12C, the mold 450 includes a lower mold 460 and an upper mold 470 closed vertically, and the pair of the holding members 480. The pair of the holding members 480 is accommodated within the lower mold 460 and the upper mold 470.

The pair of the holding members 480 is formed of a resin material having low thermal conductivity. The pair of the holding members 480 includes a lower holding member 481 and an upper holding member 482. The lower holding member 481 is accommodated on a central portion of an upper surface side (wherein "upper" means the upper surface side in FIG. 12C) of the lower mold 460. The upper holding member 482 is accommodated on a central portion of a lower surface side (wherein "lower" means the lower surface side in FIG. 12C) of the upper mold 470.

In the lower holding member 481, a central portion of its upper surface protrudes in a dome shape further upward than the upper end surface of the lower clamping portion 65. In the upper holding member 482, its lower surface is formed capable of being fitted to the upper surface of the lower holding member 481. A central portion of an upper surface of the upper holding member 482 is recessed further upward than a lower end surface of the upper clamping portion 73.

When the mold 450 is closed, the central portion of the membrane 311 is held and fixed while being deformed along a shape of a fitting surface (upper surface of the lower holding member 481, lower surface of the upper holding member 482) of the pair of the holding members 480. Then, the outer periphery 311b is fixed on the frame 20 by injecting a heat-melted resin material into the cavity CA.

Thus, the outer periphery 311b of the membrane 311 is fixed on the frame 20 in the state that the central portion of the membrane 311, namely, the part that constitutes the struck head portion 311a, has looseness. Accordingly, when the frame 20 is released from the lower mold 460 and the upper mold 470 to release the holding and fixing of the struck head portion 311a from the pair of the holding members 480, the drumhead 310 having looseness in the struck head portion 311a is manufactured.

In this manner, by fixing the outer periphery 311b on the frame 20 in the state that the central portion of the membrane 311 is held and fixed by the pair of the holding members 480, the struck head portion 311a of the drumhead 310 is made to have looseness. Therefore, when the drumhead 310 is fixed to the shell portion 30 (see FIG. 4A), the positional relationship between the struck head portion 311a and the frame 20 in the height direction when the drumhead 310 is stretched to be installed over the shell portion 30 to impart appropriate tension to the struck head portion 311a may be properly set.

Moreover, the fitting surface of the pair of the holding members 480 is formed in a dome shape. Therefore, the following may be prevented: a portion of the struck head portion 311a is held and fixed by the pair of the holding members 480 with the portion being locally deformed.

That is, the membrane 311 is intended to remain flat in a state with no load applied. For this reason, when the membrane 311 is intended to be deformed into a shape along the upper surface of the lower holding member 481, a force acts to restore the membrane 311 to its original flat state. Accordingly, by forming the fitting surface of the pair of the holding members 480 in a dome shape to make a curved surface formed in the fitting surface a more gradual shape as a whole, the following may be prevented: a portion of the membrane 311 is greatly expanded such that a resilient force of the membrane 311 acts greatly.

As a result, an operation of holding and fixing the membrane 311 by the pair of the holding members 480 may be simplified.

Next, the fifth embodiment is described with reference to FIG. 13 to FIGS. 15A, 15B. In the third and fourth embodiments, the outer periphery 311b is fixed on the frame 20 in the state that the struck head portion 311a has looseness. By contrast, in the fifth embodiment, an outer periphery 511b is fixed on a frame 520 in a state that a struck head portion 511a has tension imparted thereto. The same reference numerals denote the same portions as those in the above embodiments, and descriptions thereof are omitted.

Figure 13:
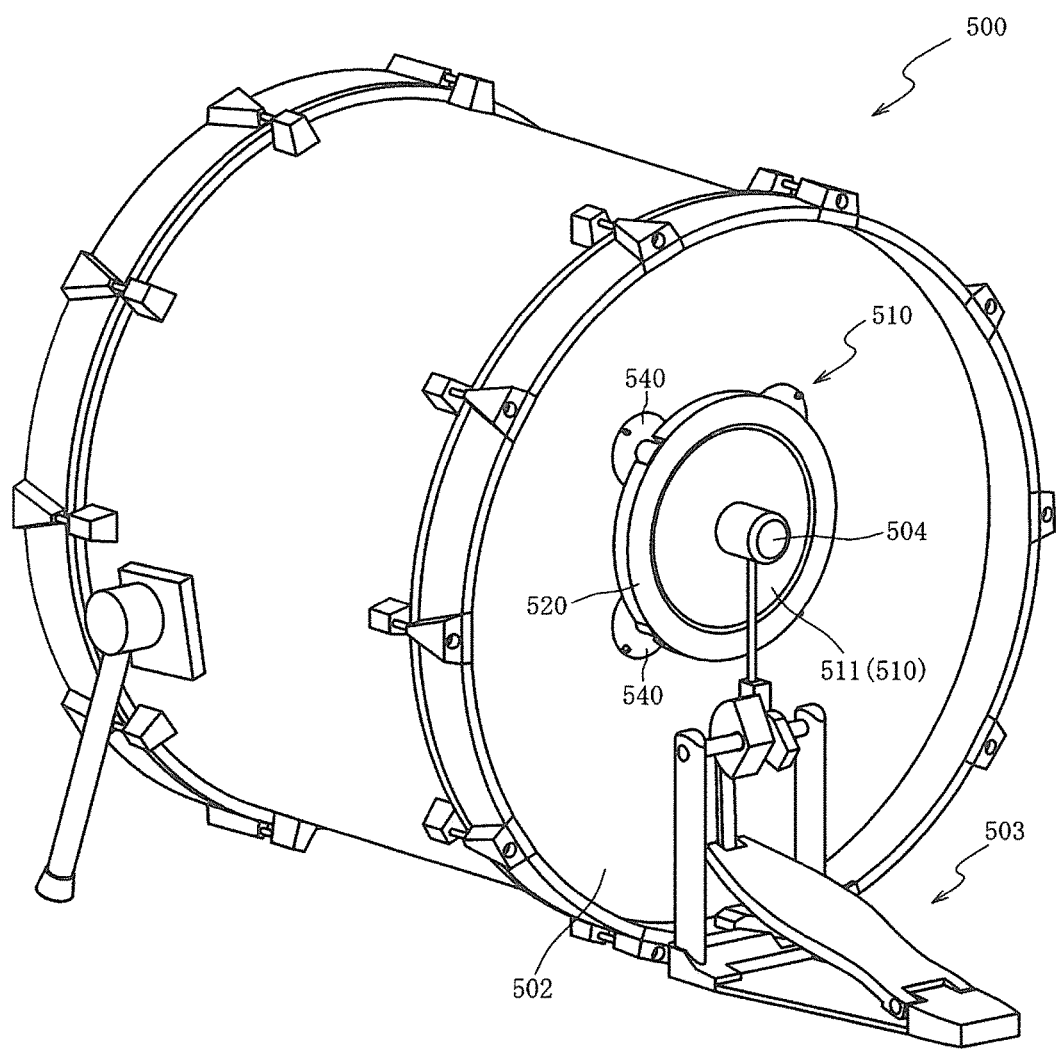
FIG. 13 is a perspective view of a bass drum with a sound-muffling drumhead attached thereto according to the fifth embodiment.
Figure 14A:
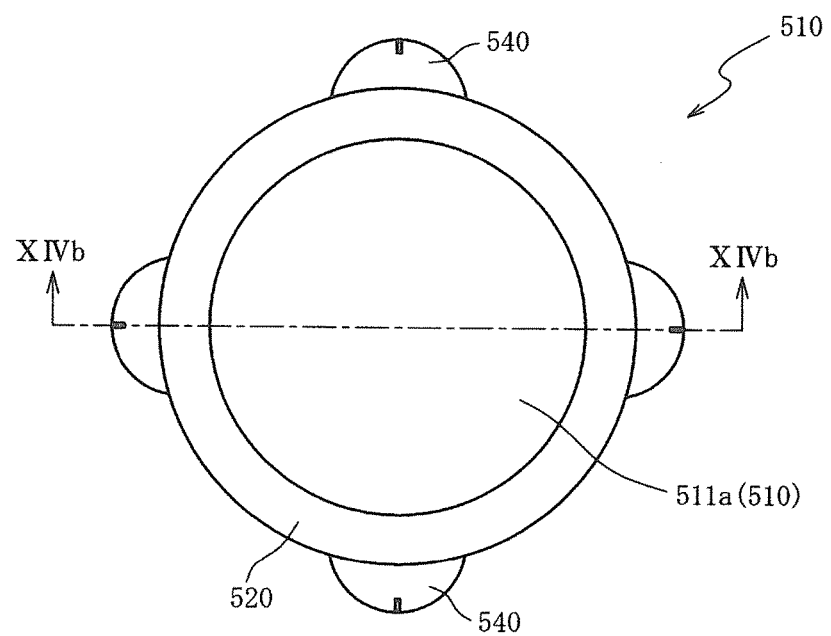
FIG. 14A is a top view of the sound-muffling drumhead.
Figure 14B:
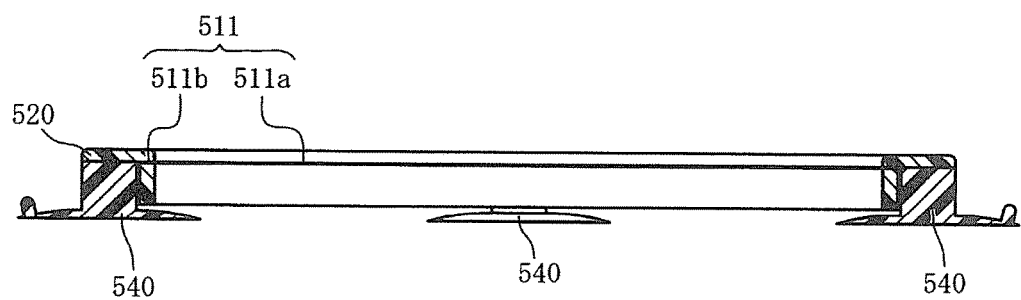
FIG. 14B is a cross-sectional view of the sound-muffling drumhead taken on line XIVb-XIVb in FIG. 14A.

First, a sound-muffling drumhead 510 according to the fifth embodiment is described with reference to FIG. 13 and FIGS. 14A, 14B. FIG. 13 is a perspective view of a bass drum 500 with the sound-muffling drumhead 510 attached thereto according to the fifth embodiment. FIG. 14A is a top view of the sound-muffling drumhead 510. FIG. 14B is a cross-sectional view of the sound-muffling drumhead 510 taken on line XIVb-XIVb in FIG. 14A.

As shown in FIG. 13, the bass drum 500 is an acoustic percussion instrument that includes a bass drumhead 502 configured as a struck head. The bass drum 500 may generate a specific tone when the bass drumhead 502 is struck by a beater 504 that rotates with a stamp on a foot pedal 503.

As shown in FIG. 13, the sound-muffling drumhead 510 is a device attached to the bass drumhead 502 for reducing the sound generated during performance. The sound-muffling drumhead 510 mainly includes a membrane 511, a frame 520 and a sucker member 540. The membrane 511 is formed of a stretchable mesh material. The frame 520 is fixed to an outer circumferential portion of the membrane 511 and is formed in an annular shape from a resin material. The sucker member 540 sucks the frame 520 onto the bass drumhead 502.

The sound-muffling drumhead 510 has the membrane 511 and the frame 520 sucked onto the bass drumhead 502 through the sucker member 540. When the foot pedal 503 is stamped by the performer, the beater 504 rotates with the stamp to strike the struck head portion 511a of the membrane 511.

As shown in FIGS. 14A, 14B, in the membrane 511, the outer periphery 511b is fixed on the frame 520 in the state that the struck head portion 511a has tension imparted thereto. Four sucker members 540 are connected to the frame 520. Further, the membrane 511 and the frame 520 are sucked onto the bass drumhead 502 through the four sucker members 540.

Thus, an operation of attaching and detaching the sound-muffling drumhead 510 to and from the bass drum 500 may be simplified. In addition, since the struck head portion 511a has tension imparted thereto in advance, a tightening bolt for imparting tension to the struck head portion 511a or an internal thread structure for screwing the tightening bolt thereinto or the like may be omitted. Accordingly, the sound-muffling drumhead 510 may be reduced in weight.

Figure 15A:
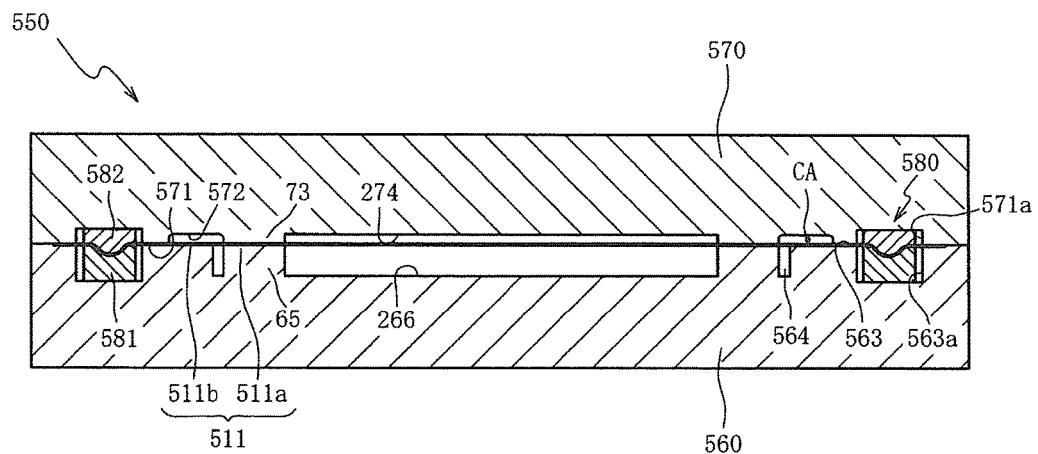
FIG. 15A is a cross-sectional view of a mold.
Figure 15B:
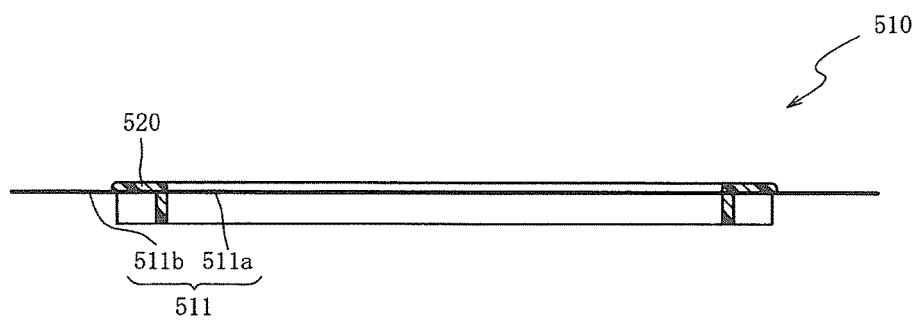
FIG. 15B is a cross-sectional view of the drumhead after molding.

Here, a mold 550 for the manufacture of the sound-muffling drumhead 510 is described with reference to FIGS. 15A, 15B. FIG. 15A is a cross-sectional view of the mold 550. FIG. 15B is a cross-sectional view of the drumhead 510 after molding. Moreover, FIG. 15A and FIG. 15B illustrate the cross section corresponding to that shown in FIG. 14B.

As shown in FIG. 15A, the mold 550 includes a lower mold 560 and an upper mold 570 closed vertically, and a pair of holding members 580. The pair of the holding members 580 is detachably accommodated within the lower mold 560 and the upper mold 570.

The lower mold 560 includes an outer edge portion 563, a lower holding member accommodating portion 563a, a lower cavity forming portion 564, the lower clamping portion 65 and the lower depressed portion 266. The outer edge portion 563 is located on an outer edge of an upper surface side of the lower mold 560. The lower holding member accommodating portion 563a is formed depressed downward in the outer edge portion 563. The lower cavity forming portion 564 is formed depressed downward in an annular shape on an inner circumferential side of the outer edge portion 563.

The upper mold 570 includes an outer edge portion facing surface 571, an upper holding member accommodating portion 571a, an upper cavity forming portion 572, the upper clamping portion 73 and the upper depressed portion 274. The outer edge portion facing surface 571 is located on an outer edge on a lower surface side of the upper mold 570 and touches the outer edge portion 563 of the lower mold 560 during closing of the mold 550. The upper holding member accommodating portion 571a is formed depressed upward in the outer edge portion facing surface 571. The upper cavity forming portion 572 is formed depressed upward on an inner circumferential side of the outer edge portion facing surface 571.

The pair of the holding members 580 is a jig for accommodating the membrane 511 within the lower mold 560 and the upper mold 570 in a state that the struck head portion 511a has tension imparted thereto. The pair of the holding members 580 includes a lower holding member 581 and an upper holding member 582. The lower holding member 581 is configured to be accommodated within the lower holding member accommodating portion 563a of the lower mold 560 and is formed in an annular shape. The upper holding member 582 is configured to be accommodated within the upper holding member accommodating portion 571a of the upper mold 570.

In the lower holding member 581, a central portion in a radial direction (horizontal direction in FIG. 15A) of an upper surface facing the upper holding member 582 is recessed further downward than the outer edge portion 563. In addition, in the upper holding member 582, its lower surface is formed in a shape capable of being fitted to the upper surface of the lower holding member 581, and a central portion in the radial direction protrudes further downward than the outer edge portion facing surface 571.

Next, a step of holding and fixing the membrane 511 by the pair of the holding members 580 is described. First, the membrane 511 is fixed in a naturally stretched state by an annular jig (not illustrated) set to have an outer diameter greater than that of the pair of the holding members 580. Here, "naturally stretched state of the membrane 511" refers to a state that the membrane 511 has no tension imparted thereto and neither does the membrane 511 have looseness. The membrane 511 fixed due to the jig is held and fixed by the pair of the holding members 580.

At this moment, a central portion in a radial direction of a fitting surface (upper surface of the lower holding member 581, lower surface of the upper holding member 582) of the pair of the holding members 580 is formed protruding downward. Thus, the membrane 511 held and fixed by the pair of the holding members 580 is in a state that tension is imparted to an inner circumferential side of the pair of the holding members 580.

Next, the annular jig (not illustrated) set to have an outer diameter greater than that of the pair of the holding members 580 is removed. Then, the pair of the holding members 580 that holds and fixes the membrane 511 is accommodated within the lower holding member accommodating portion 563a and the upper holding member accommodating portion 571a. Further, after closing of the lower mold 560 and the upper mold 570 is performed, a heat-melted resin material is injected into the cavity CA to perform injection molding of the frame 520.

Here, the heat-melted resin material shrinks when cooled. For this reason, when the frame 520 is released from the lower mold 560 and the upper mold 570 before the resin material is sufficiently cooled, the frame 520 shrinks such that an inner diameter of the frame 520 decreases. As a result, the tension imparted to the struck head portion 511a is reduced.

Accordingly, in the present embodiment, the frame 520 is not demolded immediately after injection molding. That is, the frame 520 is demolded after the mold 550 is sufficiently cooled and the resin material is solidified. Thus, the membrane 511 may be fixed on the frame 520 in a state that the struck head portion 511a has desired tension imparted thereto.

As shown in FIG. 15B, the outer periphery 511b protrudes from an outer side surface of the frame 520, wherein the frame 520 has been demolded and has the pair of the holding members 580 detached therefrom. Accordingly, after the protruding outer periphery 511b is cut off, the frame 520 is connected to the sucker member 540 (see FIG. 14B).

Here, in the present embodiment, by demolding the frame 520 after solidifying the resin material, reduction in the tension imparted to the struck head portion 511a is prevented. However, instead, a shrinkage of the frame 520 due to the cooling after the molding is foreseen, and thus greater tension may be imparted to the membrane 511 before the membrane 511 is accommodated within the lower holding member accommodating portion 563a and the upper holding member accommodating portion 571a. Here, "greater tension" refers to tension greater than a desired tension to be imparted to the struck head portion 511a of the finished drumhead 510. Thus, since a waiting time from completion of the injection molding until solidification of the resin material that composes the frame 520 becomes unnecessary, a molding cycle of the drumhead 510 by the mold 550 may be shortened.

Next, the sixth embodiment is described with reference to FIGS. 16A, 16B and FIGS. 17A, 17B. The first embodiment has described the case where the rim portion to be struck when the performer performs a rim shot is formed on the shell portion 30. However, in the sixth embodiment, the rim portion is formed in a frame 620. The same reference numerals denote the same portions as those in the above embodiments, and descriptions thereof are omitted.

Figure 16A:
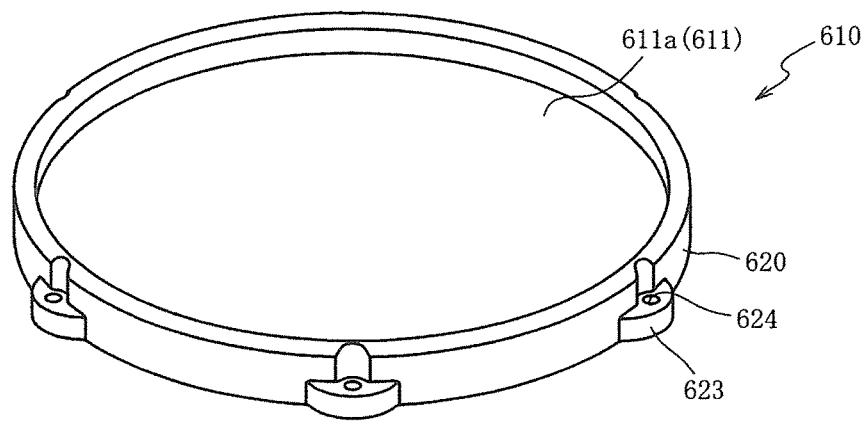
FIG. 16A is a perspective view of a drumhead according to the sixth embodiment.
Figure 16B:
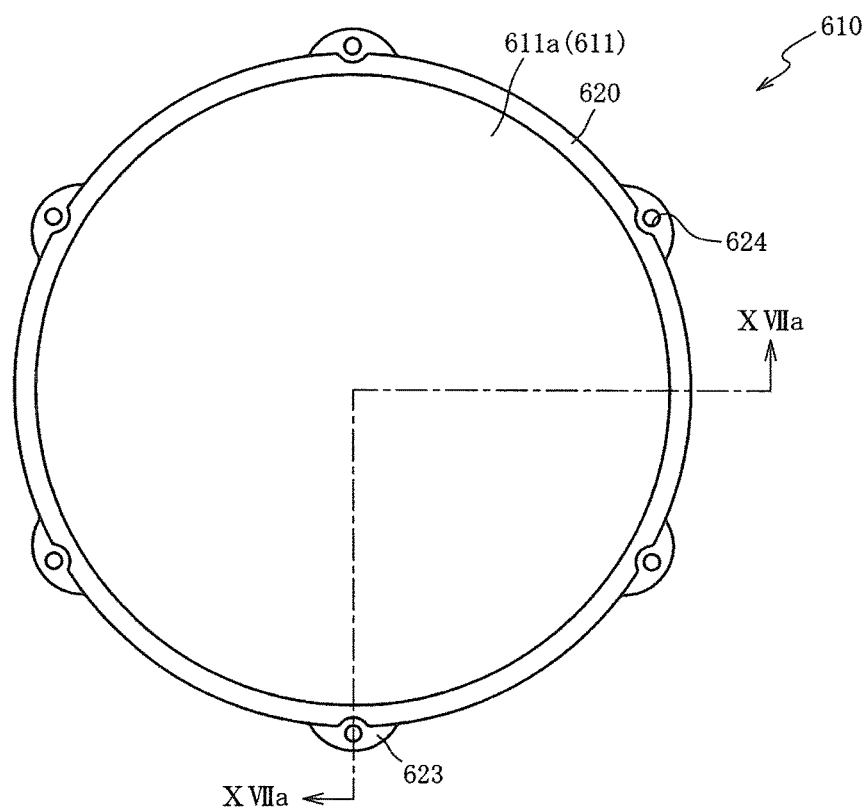
FIG. 16B is a top view of the drumhead according to the sixth embodiment.
Figure 17A:
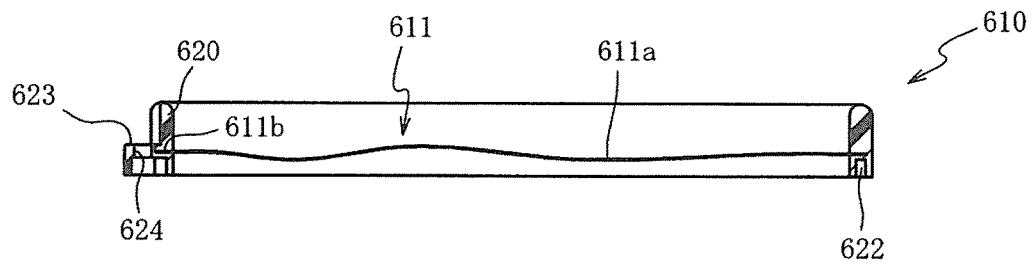
FIG. 17A is a cross-sectional view of the drumhead taken on line XVIIa-XVIIa in FIG. 16B.
Figure 17B:
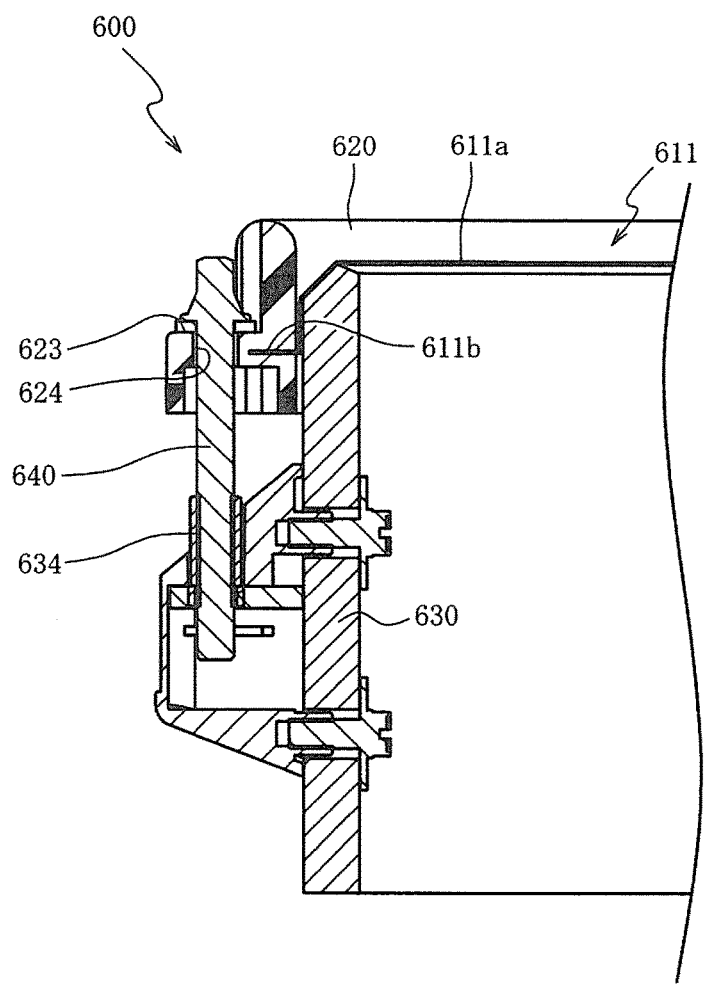
FIG. 17B is a partially enlarged cross-sectional view of a drum.

FIG. 16A is a perspective view of a drumhead 610 according to the sixth embodiment. FIG. 16B is a top view of the drumhead 610. FIG. 17A is a cross-sectional view of the drumhead 610 taken on line XVIIa-XVIIa in FIG. 16B. FIG. 17B is a partially enlarged cross-sectional view of a drum 600. Moreover, FIG. 17B illustrates the cross section corresponding to that shown in FIG. 4B.

As shown in FIGS. 16A, 16B, the drumhead 610 includes a membrane 611, and the frame 620 having an annular shape. The membrane 611 has a struck head portion 611a and an outer periphery 611b. The frame 620 is fixed to the outer periphery 611b of the membrane 611. The membrane 611 has the outer periphery 611b fixed on the frame 620 in a state that the struck head portion 611a has looseness.

As shown in FIG. 17A, in the frame 620, its upper end portion (upper side portion in FIG. 17A) protrudes further upward than the struck head portion 611a. In addition, in the frame 620, a locking portion 623 by which a later-described tightening bolt 640 (see FIG. 17B) is locked is formed to project outward in a circumferential direction. A plurality of lower relief portions 622 are depressed on a lower surface side of the frame 620. Further, a bolt hole 624 that allows the tightening bolt 640 to be inserted thereinto is formed in the locking portion 623.

Moreover, the frame 620 is formed of a resin material having elasticity capable of withstanding the striking from a rim shot. The resin material used for the frame 620 is exemplified by glass-fiber reinforced plastic or the like.

As shown in FIG. 17B, the drum 600 includes the drumhead 610, a cylindrically formed shell portion 630 and the tightening bolt 640. An internal thread portion 634 is disposed on an outer circumferential surface of the shell portion 630, wherein the internal thread portion 634 has a hole and an internal thread that allows the tightening bolt 640 to be screwed thereinto is disposed on an inner circumferential surface of the hole.

When the drumhead 610 is attached to the shell portion 630 of the drum 600, the tightening bolt 640 is screw-connected to the internal thread portion 634 while being inserted into the bolt hole 624 of the frame 620 and locked by the locking portion 623. As a result, when the frame 620 of the drumhead 610 is pressed down, the struck head portion 611a of the membrane 611 is expanded to impart tension to the struck head portion 611a.

In a state that the drumhead 610 is stretched to be installed over the shell portion 630, the upper end of the frame 620 is located higher than the struck head portion 611a. Therefore, when the performer performs a rim shot, the upper end of the frame 620 may be easily struck.

In this manner, in the drum 600, it is unnecessary to form a structure equivalent to the rim portion in the shell portion 630, such that the shape of the shell portion 630 may be simplified.

Next, the seventh embodiment is described with reference to FIGS. 18A~18C. In the first embodiment, the outer peripheries 11b and 12b are fixed on the frame 20 in the state that the two membranes 11 and 12 have looseness in the struck head portions 11a and 12a. By contrast, in the seventh embodiment, outer peripheries 711b and 712b of two membranes 711 and 712 are fixed on a frame 720 after the struck head portions 711a and 712a are thermoformed. The same reference numerals denote the same portions as those in the above embodiments, and descriptions thereof are omitted.

First, a drumhead 710 according to the seventh embodiment is described with reference to FIG. 18A and FIG. 18B. FIG. 18A is a top view of the drumhead 710 according to the seventh embodiment. FIG. 18B is a cross-sectional view of the drumhead 710 taken on line XVIIIb-XVIIIb in FIG. 18A.

As shown in FIG. 18A and FIG. 18B, the drumhead 710 includes the membranes 711 and 712, and the frame 720. The membranes 711 and 712 have the struck head portions 711a and 712a respectively, and the outer peripheries 711b and 712b respectively. The outer peripheries 711b and 712b of the membranes 711 and 712 are fixed on the frame 720.

When the drumhead 710 is attached to a drum shell portion (not illustrated), first, the struck head portions 711a and 712a are placed on the drum shell portion (not illustrated). Next, in such state, an annular hoop (not illustrated) is put over the frame 720 so as to cover it. Further, while a tightening bolt (not illustrated) is inserted into a bolt hole formed in the hoop, the tightening bolt is screw-connected to an internal thread formed on the shell portion. As a result, the outer peripheries 711b and 712b of the drumhead 710 are pressed down through the frame 720 by the hoop, and the struck head portions 711a and 712a are stretched to be installed over the shell portion.

The membranes 711 and 712 are formed in the same shape as the drumhead made of a film for use in an acoustic drum. That is, outer edges of the struck head portions 711a and 712a are formed protruding further upward than the outer peripheries 711b and 712b. Further, central portions of the struck head portions 711a and 712a are formed in a flat circular shape substantially equal to an outer diameter of the shell portion 30 (see FIG. 4B). Thus, when the drumhead 710 is attached to the shell portion 30, since the struck head portions 711a and 712a are capable of being stably placed on the shell portion 30, the operation of attaching the drumhead 710 to the shell portion 30 may be smoothly performed. Further, a positional relationship between the struck head portions 711a, 712a and the frame 720 in a height direction when the drumhead 710 is stretched to be installed over the shell portion 30 to impart appropriate tension to the struck head portions 711a and 712a may be properly set.

Next, a mold 750 for the manufacture of the drumhead 710 is described with reference to FIG. 18C. FIG. 18C is a cross-sectional view of the mold 750 and illustrates the cross section corresponding to that shown in FIG. 18B.

As shown in FIG. 18C, the mold 750 mainly includes a lower mold 760 and an upper mold 770 closed vertically, and a pair of holding members 780. The pair of the holding members 780 is configured to be accommodated within the lower mold 760 and the upper mold 770.

The lower mold 760 includes the outer edge portion 263, a lower cavity forming portion 764, a lower clamping portion 765 and the lower holding member accommodating portion 66. The lower cavity forming portion 764 is located on an inner circumferential side of the outer edge portion 263 and constitutes a portion of the cavity CA. The lower cavity forming portion 764 is formed in an annular shape as viewed from above. The lower clamping portion 765 is formed projected upward (upper direction in FIG. 18C) in an annular shape as viewed from above on an inner circumferential side of the lower cavity forming portion 764.

The lower clamping portion 765 is a part for fixing the outer edges of the struck head portions 711a and 712a of the membranes 711 and 712 from a lower surface side in closing the mold 750. The outer edge on an upper surface side of the lower clamping portion 765 is formed in an arc shape in a cross section perpendicular to a horizontal direction (forward, backward, leftward and rightward directions in FIG. 18C) of the lower mold 760.

The upper mold 770 includes the outer edge portion facing surface 271, an upper cavity forming portion 772, an upper clamping portion 773, the upper holding member accommodating portion 74 and the electromagnet 75. The upper cavity forming portion 772 is formed depressed upward in an annular shape as viewed from below on an inner circumferential side of the outer edge portion facing surface 271. The upper clamping portion 773 is formed depressed upward in an annular shape as viewed from below on an inner circumferential side of the upper cavity forming portion 772.

The upper clamping portion 773 is a part for fixing the outer edges of the struck head portions 711a and 712a of the membranes 711 and 712 from an upper surface side in closing the mold 750. The upper clamping portion 773 has an outer diameter and an inner diameter set substantially equal to those of the lower clamping portion 765. In addition, a lower surface of the upper clamping portion 773 is formed capable of being fitted to an upper surface of the lower clamping portion 765.

The pair of the holding members 780 is constituted by a lower holding member 781 and the upper holding member 82. Moreover, except that no membrane accommodating portion is formed thereon, the pair of the holding members 780 has a configuration equivalent to that of the lower holding member 81 in the first embodiment.

Next, a manufacturing method of the drumhead 710 by means of the mold 750 is described. The drumhead 710 is integrally formed by fixing the outer peripheries 711b and 712b of the two membranes 711 and 712 on the frame 720 in molding the frame 720. The lower mold 760 and the upper mold 770 are closed with the two membranes 711 and 712 disposed therebetween.

At this moment, first, the struck head portions 711a and 712a are held and fixed by the pair of the holding members 780. Then, the outer peripheries 711b and 712b exposed on an outer circumferential side of the pair of the holding members 780 are disposed within the cavity CA of the mold 750. Further, the outer edges of the struck head portions 711a and 712a exposed from the outer circumferential side of the pair of the holding members 780 are clamped between the lower clamping portion 765 and the upper clamping portion 773.

By performing molding in this state, heat from the lower mold 760 and the upper mold 770 is transferred to the outer edges of the struck head portions 711a and 712a. Accordingly, due to the heat, the outer edges of the struck head portions 711a and 712a are formed in a shape along a fitting surface between the lower clamping portion 765 and the upper clamping portion 773.

In this manner, the drumhead 710 may be manufactured by molding. Therefore, compared to the conventional drumhead of which the frame is formed of a metal material and the outer edge of the membrane is fixed on the frame by swaging or adhesion, the manufacturing process of the present invention is simplified, and manufacturing costs of the drumhead 710 may be kept down.

Next, the eighth embodiment is described with reference to FIGS. 19A, 19B. The seventh embodiment has described the case where the hoop is put over the frame 720 so as to cover it, and the hoop is screw-connected with the shell portion by the tightening bolt 640. However, in the eighth embodiment, a locking member 823 is locked to a frame 820, and the locking member 823 is screw-connected with a shell portion by the tightening bolt 640. The same reference numerals denote the same portions as those in the above embodiments, and descriptions thereof are omitted.

Figure 19A:
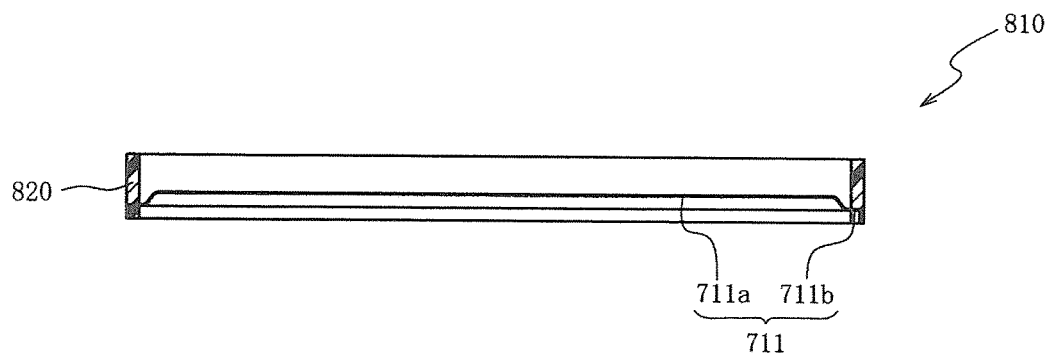
FIG. 19A is a cross-sectional view of a drumhead according to the eighth embodiment.

FIG. 19A is a cross-sectional view of a drumhead 810 according to the eighth embodiment. FIG. 19B is a perspective view of the drumhead 810. Moreover, FIG. 19A illustrates the cross section corresponding to that shown in FIG. 18B.

As shown in FIG. 19A, the drumhead 810 includes the membrane 711, and the frame 820 to which the outer periphery 711b of the membrane 711 is fixed. An upper end surface of the frame 820 is located higher than the struck head portion 711a.

Figure 19B:
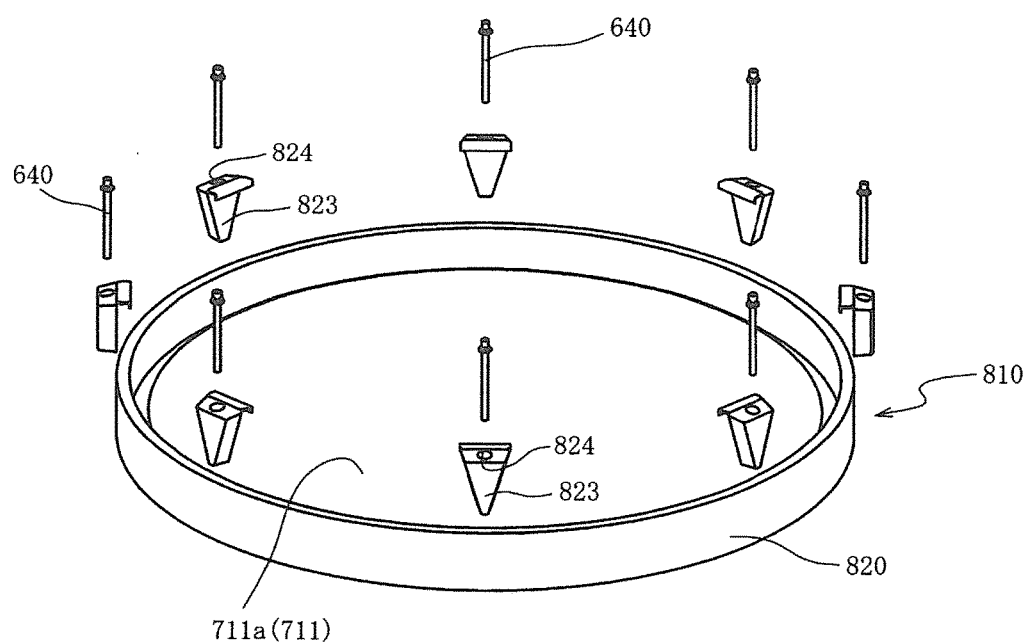
FIG. 19B is a perspective view of the drumhead.

As shown in FIG. 19B, the locking member 823 capable of locking the tightening bolt 640 is configured detachable from the frame 820. A bolt hole 824 that allows the tightening bolt 640 to be inserted thereinto is drilled in each locking member 823.

Therefore, when the drumhead 810 is attached to a drum shell portion (not illustrated), first, the locking member 823 is locked to the frame 820. Next, after the drumhead 810 is placed on an open upper surface of the shell portion, the tightening bolt 640 is inserted into the bolt hole 824 and locked by the locking member 823. Further, the tightening bolt 640 is screw-connected to an internal thread formed on the shell portion. Thus, the struck head portion 711a is stretched to be installed over the shell portion.

In a case where the drumhead 810 is used in a bass drum, a patch for reinforcing the struck head portion 711a may be integrally formed by double molding (two-color molding) at a position within the struck head portion 711a to be struck by the beater. In such case, compared to a case where the patch is post-attached to the struck head portion 711a, fall-off of the patch during use may be prevented. Moreover, examples of a material used as the patch include an elastic material capable of being integrally formed with the membrane 711. The elastic material is exemplified by a thermoplastic elastomer or the like.

Next, the ninth embodiment is described. The seventh embodiment has described the case where the outer peripheries 711b and 712b of the two membranes 711 and 712 are fixed on the frame 720 in the state that the outer edges of the outer peripheries 711b and 712b are disposed within the frame 720. However, in the ninth embodiment, an outer periphery 911b of one membrane 911 is fixed on a frame 920 in a state that an outer edge of the outer periphery 911b protrudes toward an outer circumferential side from the frame 920. The same reference numerals denote the same portions as those in the above embodiments, and descriptions thereof are omitted.

Figure 20:
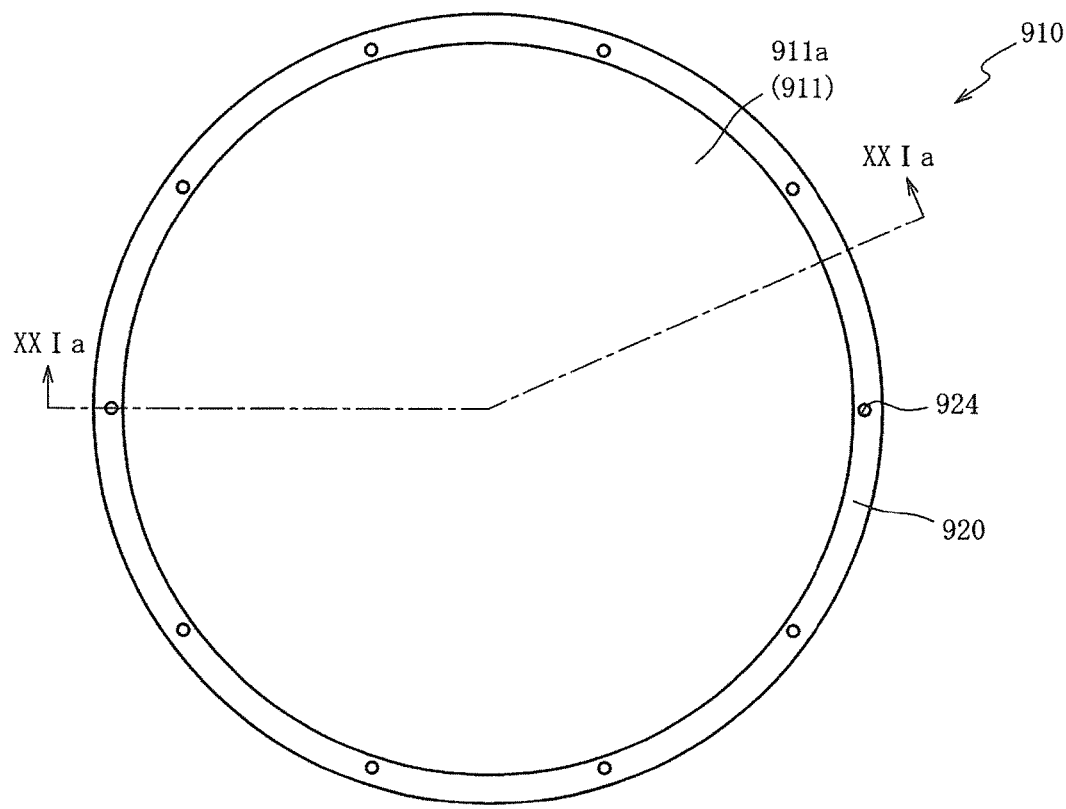
FIG. 20 is a top view of a drumhead according to the ninth embodiment.

First, a drumhead 910 is described with reference to FIG. 20 and FIG. 21A. FIG. 20 is a top view of the drumhead 910 according to the ninth embodiment. FIG. 21A is a cross-sectional view of the drumhead 910 taken on line XXIa-XXIa in FIG. 20.

As shown in FIG. 20 and FIG. 21A, the drumhead 910 is a head for use in a drum described in Japanese Patent Application No. 2013-084682 previously filed by the present inventors. The drumhead 910 mainly includes the membrane 911, and the frame 920 having an annular shape. The membrane 911 has a struck head portion 911a and an outer periphery 911b. The frame 920 is fixed to the outer periphery 911b of the membrane 911. Detail descriptions of the drum according to the present embodiment are omitted.

An outer edge of the struck head portion 911a is formed protruding further upward than the outer periphery 911b. Further, a central portion of the struck head portion 911a is formed in a flat circular shape.

The frame 920 is formed in a thin wall shape in which its thickness (length in the vertical direction in FIG. 21A) is smaller than a length in a radial direction (horizontal direction in FIG. 21A) of the frame 920. In addition, a bolt hole 924 for an assembling screw (not illustrated) to be fitted into is formed through the frame 920 in the thickness direction of the frame 920.

Here, a gate trace (not illustrated) is formed on a lower surface side of the frame 920. In addition, in the membrane 911, a first cutting-off portion (not illustrated) is formed within the outer periphery 911b at a position corresponding to a position where the gate trace is formed. Further, in the membrane 911, a second cutting-off portion 911d is formed within the outer periphery 911b at a position corresponding to a position where the bolt hole 924 is formed.

Moreover, the second cutting-off portion 911d is formed in a substantially circular shape in a top view of the membrane 911. In addition, an inner diameter of the second cutting-off portion 911d is set allowing a bolt hole forming portion 967 of a later-described lower mold 960 to be inserted thereinto.

Next, a mold 950 for the manufacture of the drumhead 910 is described with reference to FIG. 21B. FIG. 21B is a cross-sectional view of the mold 950 and illustrates the cross section corresponding to that shown in FIG. 21A.

As shown in FIG. 21B, the mold 950 mainly includes the lower mold 960 and an upper mold 970 closed vertically, and the pair of holding members 780. The pair of the holding members 780 is configured to be accommodated within the lower mold 960 and the upper mold 970.

The lower mold 960 includes an outer edge portion 963, a lower cavity forming portion 964, a lower clamping portion 965 and the lower holding member accommodating portion 66. The outer edge portion 963 is located on an outer edge of an upper surface side of the lower mold 960. The lower cavity forming portion 964 is depressed downward on an inner circumferential side of the outer edge portion 963. Further, the lower cavity forming portion 964 constitutes a portion of the cavity CA and is formed in an annular shape as viewed from above. The lower clamping portion 965 is formed projected upward (toward the upper direction in FIG. 21B) in an annular shape as viewed from above on an inner circumferential side of the lower cavity forming portion 964.

A plurality of the bolt hole forming portions 967 are formed projected in the lower cavity forming portion 964, wherein the bolt hole forming portions 967 are installed adjacent to one another in an equally spaced manner on a depressed bottom surface. A gate (not illustrated) is formed open at a part located between the plurality of the bolt hole forming portions 967 in the depressed bottom surface of the lower cavity forming portion 964.

The lower clamping portion 965 is a part for fixing the outer edge of the struck head portion 911a of the membrane 911 from a lower surface side in closing the mold 950. In addition, an outer edge on an upper surface side of the lower clamping portion 965 is formed in an arc shape in a cross section perpendicular to a horizontal direction (forward, backward, leftward and rightward directions in FIG. 21B) of the lower mold 960. Further, a height of a lower end portion (part connected with the lower cavity forming portion 964) of the lower clamping portion 965 from the lower cavity forming portion 964 is set substantially equal to a height of the outer edge portion 963 from the lower cavity forming portion 964.

The upper mold 970 includes an outer edge portion facing surface 971, an upper cavity forming portion 972, an upper clamping portion 973, the upper holding member accommodating portion 74 and the electromagnet 75. The outer edge portion facing surface 971 is located on an outer edge on a lower surface side of the upper mold 970 and touches the outer edge portion 963 of the lower mold 960 during closing of the mold 950. The upper cavity forming portion 972 is depressed upward on an inner circumferential side of the outer edge portion facing surface 971. Further, the upper cavity forming portion 972 constitutes a portion of the cavity CA and is formed in an annular shape as viewed from below. The upper clamping portion 973 is formed in an annular shape as viewed from below on an inner circumferential side of the upper cavity forming portion 972.

The upper clamping portion 973 is a part for fixing the outer edge of the struck head portion 911a of the membrane 911 from an upper surface side in closing the mold 950. The upper clamping portion 973 has an outer diameter and an inner diameter set substantially equal to those of the lower clamping portion 965. In addition, a lower surface of the upper clamping portion 973 is formed capable of being fitted to an upper surface of the lower clamping portion 965.

Next, a manufacturing method of the drumhead 910 by means of the mold 950 is described. First, a first cutting-off portion, and the second cutting-off portion 911d are formed with respect to the membrane 911 set to have a diameter greater than an outer diameter of the frame 920. Then, a central portion of the membrane 911 having the first cutting-off portion and the second cutting-off portion 911d formed therein is held and fixed by the pair of the holding members 780.

Next, the pair of the holding members 780 that holds and fixes the membrane 911 is accommodated within a space formed by the lower holding member accommodating portion 66 and the upper holding member accommodating portion 74. In such state, the lower mold 960 and the upper mold 970 are closed.

At this moment, the cavity CA having an annular shape is formed within the mold 950 by the lower cavity forming portion 964 and the upper cavity forming portion 972. In addition, the bolt hole forming portion 967 is inserted into the second cutting-off portion 911d formed in the outer periphery 911b of the membrane 911, and an upper end of the bolt hole forming portion 967 touches a depressed bottom surface of the upper cavity forming portion 972.

The membrane 911 has a diameter greater than an outer diameter of the cavity CA (i.e. the outer diameter of the frame 20). Therefore, a portion of the outer periphery 911b is held and fixed between the outer edge portion 963 of the lower mold 960 and the outer edge portion facing surface 971 of the upper mold 970. Thus, a part of the outer periphery 911b located within the cavity CA may be maintained in a state of being disposed at a central portion in the vertical direction (vertical direction in FIG. 21B) of the cavity CA.

When molding is performed in such state, heat from the lower mold 960 and the upper mold 970 is transferred to a portion of the membrane 911 clamped by the lower clamping portion 965 and the upper clamping portion 973. Due to the heat, the membrane 911 is formed in a shape along a fitting surface between the lower clamping portion 965 and the upper clamping portion 973. As a result, the drumhead 910 may be manufactured by molding, wherein in the drumhead 910, the outer edge of the struck head portion 911a is formed protruding further upward than the outer periphery 911b.

In addition, in the state that the upper end of the bolt hole forming portion 967 touches the upper cavity forming portion 972, a heat-melted resin material is injected into the cavity CA. Accordingly, the bolt hole 924 may be integrally formed in the injection-molded frame 920. Therefore, with respect to the frame 920 after molding, an operation of forming the bolt hole 924 therethrough is unnecessary. That is, the manufacturing process of the drumhead 910 may be simplified.

Moreover, in the present embodiment, the bolt hole forming portion 967 is formed projected upward from the depressed bottom surface of the lower cavity forming portion 964 of the lower mold 960. However, the bolt hole forming portion may also be formed projected downward from the depressed bottom surface of the upper cavity forming portion 972 of the upper mold 970.

Further, in the membrane 911, the second cutting-off portion 911d is formed by cutting off a part of the outer periphery 911b. Therefore, the bolt hole 924 may be prevented from being blocked by the outer periphery 911b. As a result, with respect to the frame 920 after injection molding, an operation of cutting off the outer periphery 911b that blocks the bolt hole 924 is unnecessary. That is, the manufacturing process of the drumhead 910 may be simplified.

In addition, during injection molding, in the membrane 911, a portion of the outer periphery 911b is held and fixed between the outer edge portion 963 and the outer edge portion facing surface 971. Further, the part of the outer periphery 911b located within the cavity CA is maintained in the state of being disposed at the central portion in the vertical direction of the cavity CA. Therefore, the outer periphery 911b may be prevented from being turned up by the force of the resin material injected from the gate, and also from emerging from an upper surface or a lower surface of the frame 920. That is, the drumhead 910 may be improved in appearance.

In addition, the membrane 911 may be fixed on the frame 920 in a state that the outer periphery 911b is buried in a central portion in the thickness direction (vertical direction in FIG. 20A) of the frame 920. Accordingly, even in the drumhead 910 in which the thickness of the frame 920 is set small, the membrane 911 may be strongly fixed on the frame 920. Therefore, when tension is imparted to the struck head portion 911a in a state that the drumhead 910 is disposed on an upper surface of a shell portion (not illustrated), the outer periphery 911b may be suppressed from being peeled off or separated from the frame 920.

Moreover, in a state that the injection-molded frame 920 has been released from the mold 950 and the pair of the holding members 780 has been detached from the membrane 911, the outer periphery 911b protrudes from an outer side surface of the frame 920. Accordingly, the protruding outer periphery 911b is cut off.

In this manner, the drumhead 910 may be manufactured by molding. Therefore, for example, compared to a case where a pair of members formed in an annular shape is subjected to adhesion or welding with the outer periphery 911b of the membrane 911 clamped between the pair of the members, the manufacturing process is simplified, and manufacturing costs of the drumhead 910 may be kept down.

The above illustrates the present invention on the basis of the embodiments. However, it should be understood that the present invention is not limited to any of the embodiments, and various modifications or alterations may be made without departing from the spirit of the present invention.

For example, in the above embodiments, the drumheads 10, 210, 310, 410, 610, 710 and 810 serve as a member that constitutes the drums 100 and 600 that simulate a snare drum. In addition, the drumhead 510 serves as a sound-muffling drumhead attached to the bass drum 500. Further, the drumhead 910 serves as a head for use in the drum described in Japanese Patent Application No. 2013-084682. However, the present invention is not limited thereto. The drumheads 10, 210, 310, 410, 510, 610, 710, 810 and 910 may also serve as a member that constitutes a percussion instrument that simulates a tam-tam, a floor tom or a bass drum. In addition, they may also serve as a sound-muffling drumhead attached to percussion instruments other than the bass drum 500.

In the above embodiments, the membranes 11, 12, 311, 511, 611, 711, 712 and 911 are formed of a stretchable mesh material. However, the present invention is not limited thereto. The membranes may also be formed of other membranous materials. Examples of the other membranous materials include a resin film for use in an acoustic drum, a material having stretchability and air permeability obtained by forming a plurality of through holes in the above resin film, or the like. In addition, in the case where the membrane is formed of the resin film for use in an acoustic drum, it is desired that holes be drilled in advance in the circumferential portion of the membrane fixed on the frames 20, 520, 620, 720, 820 and 920. By doing that, when the membrane and the frames 20, 520, 620, 720, 820 and 920 are integrally formed together, the resin material may enter the holes of the membrane. As a result, a bonding strength between the membrane and the frames 20, 520, 620, 720, 820 and 920 may be increased.

In the first embodiment, in the state where the drumhead 10 is stretched to be installed over the shell portion 30, the struck head portion 11a of the membrane 11 and the upper surface of the frame 20 are disposed substantially coplanar with each other. However, the present invention is not limited thereto. In consideration that the struck head portion 11a is extended with use, the upper surface of the frame 20 may also be disposed higher than the membrane 11.

In the first to fourth embodiments, when the locking portion 23 is formed in the frame 20, the internal thread that allows the tightening bolt 40 to be screwed thereinto is formed in the shell portion 30. However, the present invention is not limited thereto. The following configuration is also applicable: when the locking portion 23 is formed in the shell portion 30, the internal thread is formed in the frame 20, such that the tightening bolt 40 is screwed from the shell portion 30 into the frame 20 to connect both.

In the sixth embodiment, the frame 620 is formed of the resin material having elasticity capable of withstanding the striking from a rim shot. That is, when the performer performs a rim shot, the upper end of the frame 620 is directly struck. However, the present invention is not limited thereto. A rubbery elastic body, urethane resin or the like that has higher elasticity than the membrane may also be adhered or attached or be integrally formed to an upper portion of the frame 620 by double molding (two-color molding). Thus, the shell portion 630 may be prevented from damage due to the impact caused by the striking. In addition, in the case where the above rubbery elastic body, urethane resin or the like is integrally formed in the frame 620 by double molding, the former may be strongly attached to the frame 620 compared to the case of using an adhesion or attachment method. Further, the manufacturing process of the drumhead 610 may be simplified. In such case, it is not necessary that the frame 620 be formed of the resin material having elasticity capable of withstanding the striking from a rim shot, and the frame 620 may also be formed of other resin materials.

In the first and ninth embodiments, in the state that the molds 50 and 950 are closed, the first cutting-off portions 11c and 12c of the membranes 11, 12 and 911 are disposed at the positions corresponding to the gate 69. Further, the gate trace 22a is formed in the molded frames 20 and 920 at the position corresponding to the first cutting-off portions 11c and 12c. However, the present invention is not limited thereto. The first cutting-off portions 11c and 12c may be disposed at positions different from that of the gate 69, and the gate trace 22a may be formed at positions different from that of the first cutting-off portions 11c and 12c. Thus, the resin material injected into the cavity CA may be spread over from the first cutting-off portions 11c and 12c to both the upper and lower surface sides of the outer peripheries 11b, 12b and 911b. That is, the resin material may be spread throughout the entire cavity CA. Accordingly, defective formation of the frames 20 and 920 may be suppressed.

In addition, in the first and ninth embodiments, a number of the gate 69 formed in the lower molds 60 and 960 is equal to numbers of the first cutting-off portions 11c and 12c formed in the membranes 11, 12 and 911. However, the present invention is not limited thereto. The number of the gate 69 may also be different from the numbers of the first cutting-off portions 11c and 12c.

In the first and ninth embodiments, the second cutting-off portions 11d, 12d and 911d are formed in the outer peripheries 11b, 12b and 911b of the membranes 11, 12 and 911. Further, the second cutting-off portions 11d, 12d and 911d are disposed at the positions corresponding to the bolt hole forming portions 67 and 967 during closing of the mold 50. However, the present invention is not limited thereto. The second cutting-off portions 11d, 12d and 911d may also be omitted.

In such case, in the first embodiment, the outer peripheries 11b and 12b may also be held and fixed by the upper end surface of the bolt hole forming portion 67 and the lower end surface of the locking portion forming portion 78 during closing of the mold 50. Thus, the outer peripheries 11b and 12b may be further prevented from being turned up during injection molding.

In the ninth embodiment, a height of the bolt hole forming portion 967 of the lower mold 960 from the lower cavity forming portion 964 is decreased to be substantially equal to a height of the lower clamping portion 965 from the lower cavity forming portion 964. Further, the bolt hole forming portion is formed projected downward from the depressed bottom surface of the upper cavity forming portion 972 of the upper mold 970. During closing of the mold 950, a projected tip surface of the bolt hole forming portion formed protruding on the lower cavity forming portion 964 is configured to touch its counterpart formed protruding on the upper cavity forming portion 972. Thus, the bolt hole 924 may be integrally formed in the frame 920, and the part of the outer periphery 911b located within the cavity CA may be held and fixed by the bolt hole forming portion. Therefore, the outer periphery 911b may be further prevented from being turned up during injection molding.

In the state that the frames 20 and 920 are molded, the bolt holes 24 and 924 are blocked by the outer peripheries 11b, 12b and 911b. Therefore, by cutting off the outer peripheries 11b, 12b and 911b that block the bolt holes 24 and 924, the tightening bolt 40 may be allowed to be inserted into the bolt holes 24 and 924.

In the first embodiment, the membranes 11 and 12 in the state of being held and fixed by the pair of the holding members 80 have an outer diameter greater than the diameter of the virtual circle VC that connects the centers of the plurality of the bolt holes 24. Further, the outer edges of the membranes 11 and 12 are located on a further outer circumferential side than the bolt hole forming portion 67 and the lower relief forming portion 68 of the lower mold 60. However, the present invention is not limited thereto. The membranes 11 and 12 in the state of being held and fixed by the pair of the holding members 80 may also have an outer diameter smaller than the diameter of the virtual circle VC.

In such case, it is desired that a length from an inner edge of the outer peripheries 11b and 12b in a radial direction (horizontal direction in FIG. 9) be smaller than the shortest distance from the inner edge to the upper surface of the frame 20. Here, "the upper surface of the frame 20" refers to the portion where the upper relief portion 21 is formed according to the first embodiment. Thus, even in the case where the outer periphery is turned up by the injected resin material during molding, the outer periphery may be prevented from emerging from the upper surface of the molded frame 20. Therefore, the drumhead may be improved in appearance.

In the first embodiment, among the two membranes 11 and 12, the membrane 11 disposed on the upper surface side has a diameter small than that of the membrane 12 disposed on the lower surface side. However, the present invention is not limited thereto. The two membranes 11 and 12 may also have the same diameter, or the membrane 11 may have a diameter greater than that of the membrane 12.

In addition, in the first embodiment, both the struck head portion 11a of the membrane 11 disposed on the upper surface side and the struck head portion 12a of the membrane 12 disposed on the lower surface side have looseness, and the struck head portion 12a of the membrane 12 is looser than the struck head portion 11a of the membrane 11. However, the present invention is not limited thereto. The struck head portion 11a of the membrane 11 may be looser than the struck head portion 12a of the membrane 12. In addition, it may be that only one of the struck head portion 11a of the membrane 11 and the struck head portion 12a of the membrane 12 has looseness, and the other is in the natural state.

In the first embodiment, the gate trace 22a is formed on the inner wall surface of the lower relief portion 22. However, the present invention is not limited thereto. The gate trace 22a may also be formed on an outer wall surface or a bottom surface of the lower relief portion 22, or at positions in the frame 20 other than in the lower relief portion 22. In addition, in the first embodiment, the gate 69 is formed open on the upper surface of the lower relief forming portion 68. However, the present invention is not limited thereto. The gate 69 may also be formed open on a side surface of the lower relief forming portion 68 or on an upper surface of the lower cavity forming portion 64.

In the first embodiment, the drumhead 10 includes the two membranes 11 and 12. However, the present invention is not limited thereto. The drumhead 10 may also include three or more membranes.

In the first to fourth embodiments, the bolt hole forming portion 67 is formed in the lower mold 60. However, the present invention is not limited thereto. The bolt hole forming portion 67 may also be formed protruding downward from a lower side of the locking portion forming portion 78 formed in the upper mold 70.

The configurations described in each of the embodiments are interchangeable with those described in another embodiment. In addition, the configurations described in each of the embodiments may be combined with or accompanied by those described in another embodiment. For example, the membrane 311 described in the third embodiment that has looseness in the struck head portion 311a, or the membrane 511 described in the fifth embodiment that has tension imparted to the struck head portion 511a, may be interchangeable with the membrane 711 described in the seventh embodiment.

In addition to the drums and drumheads of the present invention, the various invention concepts contained in the above embodiments are shown hereinafter.

A mold A1 is a mold for manufacture of a drumhead, wherein the drumhead includes: a plurality of membranes formed of a mesh material and having a struck head portion configured as a striking face to be struck by a performer and an outer periphery located on an outer circumferential side of the struck head portion; and an annular frame formed of a resin material, the frame having the outer periphery of the plurality of the membranes fixed thereto. The mold A1 is characterized by including: a lower mold; an upper mold that forms an annular cavity between itself and the lower mold; an accommodating portion that is a space formed on an inner circumferential side of the cavity; a clamping portion formed between the accommodating portion and the cavity and configured to clamp an outer edge of the struck head portion; and a pair of holding members detachably accommodated within the accommodating portion and configured to hold the membranes.

According to the mold A1, the outer edge of the struck head portion is clamped by the clamping portion. Accordingly, a resin material injected into the cavity may be prevented from entering the accommodating portion. That is, the resin material may be prevented from entering the struck head portion of the drumhead to be manufactured. That is, the drumhead may be improved in appearance.

In addition, the pair of the holding members is configured detachable. Accordingly, an operation of holding and fixing the membranes accommodated within the lower mold and the upper mold by the pair of the holding members may be proceeded with concurrently with the injection molding of the frame using the mold in preparation for a subsequent injection molding using the mold. Thus, a molding cycle from completion of a previously performed injection molding until a start of a subsequent injection molding may be shortened. That is, the manufacture of the drumhead may be enhanced in efficiency.

A mold A2 is characterized in that in the mold A1, the lower mold includes a plurality of lower relief portions formed protruding on a part that forms a portion of the cavity on an upper surface side facing the upper mold, wherein a gate for injecting a resin material injected from outside into the cavity is formed open in the lower relief portions.

According to the mold A2, the gate is formed in the lower relief portions. Accordingly, in addition to the effect of the mold A1, a gate trace that remains on the frame after being molded by injecting the resin material from the gate may be formed on an inner wall surface of the lower relief portions. Thus, the gate trace may be made inconspicuous in the appearance of the drumhead. That is, the drumhead may be improved in appearance.

A mold A3 is characterized in that in the mold A2, the upper mold includes a fixing pin protruding at a position corresponding to the lower relief portions, wherein in a state that the lower mold and the upper mold are closed, the outer periphery of the membranes is held and fixed between the fixing pin and the lower relief portions.

According to the mold A3, the outer periphery is held and fixed between the fixing pin and the lower relief portions in the state that the lower mold and the upper mold are closed. Accordingly, in addition to the effect of the mold A2, the outer periphery may be suppressed from being turning upward by a force of the resin material injected from the gate during injection molding. Thus, the following may be prevented: the outer periphery is turned up during injection molding and emerges from a surface of the frame after molding.

A mold A4 is characterized in that in the molds A1 to A3, in the state that the lower mold and the upper mold are closed, a gap is formed between the lower mold or the upper mold and the pair of holding members.

According to the mold A4, in the state that the lower mold and the upper mold are closed, a gap is formed between the lower mold or the upper mold and the pair of holding members. Accordingly, in addition to the effects of the molds A1 to A3, heat of the lower mold or the upper mold may be suppressed from being transferred to the pair of holding members during molding. As a result, heat transfer from the lower mold or the upper mold to the struck head portion of the membranes may be suppressed. That is, thermal shrinkage of the struck head portion during molding may be prevented.

A mold A5 is characterized in that in the molds A1 to A4, the lower mold includes a bolt hole forming portion formed protruding on a part that forms a portion of the cavity on the upper surface side facing the upper mold, wherein an upper end surface of the bolt hole forming portion touches the upper mold.

According to the mold A5, the bolt hole forming portion is formed protruding in the lower mold at a position where a portion of the cavity is formed, wherein the upper end surface of the bolt hole forming portion touches the upper mold. Accordingly, in addition to the effects of the molds A1 to A4, a bolt hole that allows a tightening bolt to be inserted into may be integrally formed in the frame. As a result, in a case where the drumhead is stretched to be installed over a shell portion of the drum, a hoop for fixing the drumhead to the shell portion is unnecessary. That is, a number of members of the drum may be decreased.

A mold A6 is characterized in that in the molds A1 to A5, the lower mold includes: a main body portion; and an ejecting body detachably formed in the main body portion and pushing the molded frame out of the lower mold when the molded frame is released from the mold during demolding, wherein the ejecting body includes a through hole formed open in a circular shape at its central portion, the main body portion is configured to be fitted into the through hole, and an inner circumferential edge portion of the ejecting body constitutes a portion of the cavity in the closed state.

According to the mold A6, the main body portion is configured to be fitted into the through hole, and the inner circumferential edge portion of the ejecting body constitutes a portion of the cavity. Accordingly, in addition to the effects of the molds A1 to A5, when the frame is released from the lower mold, the inner circumferential edge portion of the ejecting body may touch the frame. That is, when the frame is pushed out by the ejecting body, it may be ensured that a large area of the ejecting body touches the frame. Thus, pushing-out pressure from the ejecting body may be prevented from being locally concentrated to the frame. Therefore, deformation of the frame after molding due to the pushing-out pressure may be suppressed. That is, the tension imparted to the struck head portion of the drumhead may be suppressed from becoming non-uniform.

A manufacturing method A7 of a drumhead is a manufacturing method of a drumhead using the mold described as any one of the molds A1 to A6, characterized by including the following steps: a holding step of holding and fixing the plurality of the membranes by the pair of the holding members; an accommodating step of accommodating the pair of the holding members that holds and fixes the plurality of the membranes in the holding step within the lower mold and the upper mold; a forming step of integrally farthing the frame with the membranes by closing the lower mold and the upper mold that accommodate the pair of the holding members in the accommodating step and injecting the resin material into the cavity; a demolding step of releasing the frame formed in the forming step, the membranes and the pair of the holding members from the mold; and a fixation releasing step of releasing the holding and fixing of the plurality of the membranes released from the mold in the demolding step from the pair of the holding members.

According to the manufacturing method of a drumhead A7, the same effect as that of the mold A1 is obtained.

What is claimed is:

1. A percussion instrument, comprising
a cylindrical shell portion having an open upper surface side; and
a drumhead stretched to be installed on the upper surface side of the shell portion, wherein the drumhead comprises
a membrane formed of a membranous material, comprising
a struck head portion configured as a striking face to be struck by a performer; and
an outer periphery located on an outer circumferential side of the struck head portion; and
an annular frame formed of a resin material, wherein the outer periphery of the membrane is fixed on the frame, the membrane and the frame are integrally formed by injecting the resin material into a closed cavity, and the membrane is formed by a mesh material; and
a plurality of tightening bolts that fix the frame to the shell portion while imparting tension to the struck head portion and are threaded by external threads to be screwed into internal threads disposed on the shell portion or the frame, wherein
the frame comprises a plurality of bolt holes that allow the tightening bolts to be inserted thereinto.

2. The percussion instrument according to claim 1, comprising an annular hoop that imparts tension to the struck head portion by pressing down the outer periphery while the struck head portion is disposed on the upper surface side of the shell portion, wherein
the hoop is integrally formed with the frame.

3. The percussion instrument according to claim 1, wherein the membrane is fixed on the frame while an outer edge of the outer periphery is disposed inside the frame.

4. The percussion instrument according to claim 1, wherein the frame comprises
a lower relief portion depressed on a lower surface side of the frame; and
a gate trace formed by injecting the resin material during integration of the membrane and the frame is formed on an inner wall surface of the lower relief portion.

5. The percussion instrument according to claim 4, wherein the membrane comprises a first cutting-off portion formed by cutting off a part of the outer periphery of the membrane.

6. The percussion instrument according to claim 5, wherein the frame is formed at a position such that the gate trace corresponds to the first cutting-off portion.

7. The percussion instrument according to claim 1, wherein a length of the membrane from an inner edge of the outer periphery in a radial direction is set smaller than a shortest distance from the inner edge to an upper surface of the frame.

8. The percussion instrument according to claim 1, wherein the outer periphery of the membrane has an outer diameter set greater than a diameter of a virtual circle that passes through the plurality of the bolt holes.

9. The percussion instrument according to claim 1, wherein the outer periphery of the membrane is fixed on the frame while the struck head portion has looseness.

10. The percussion instrument according to claim 1, wherein the membrane comprises a plurality of the membrane parts, and one of the plurality of the membrane parts is set looser than the other of the plurality of the membrane parts.

11. The percussion instrument according to claim 1, wherein the outer periphery of the membrane is fixed on the frame while the struck head portion has tension imparted thereto.

12. The percussion instrument according to claim 1, wherein an outer edge of the struck head portion protrudes further upward than the outer periphery of the membrane.

13. A drumhead, for a percussion instrument comprising
a shell portion having an open upper surface side, comprising:
a membrane formed of a membranous material, comprising
a struck head portion configured as a striking face to be struck by a performer; and
an outer periphery located on an outer circumferential side of the struck head portion;
an annular frame formed of a resin material; and
an annular hoop that has a plurality of bolt holes and imparts tension to the struck head portion by pressing down the outer periphery while the struck head portion is disposed on the upper surface side of the shell portion, wherein the hoop is integrally formed with the frame,
wherein the outer periphery of the membrane is fixed on the frame, the membrane and the frame are integrally formed by injection molding,
the plurality of bolt holes are adapted to allow a plurality of tightening bolts to be inserted thereinto, wherein the plurality of tightening bolts are adapted to fix the frame to the shell portion while imparting tension to the struck head portion and are threaded by external threads to be screwed into internal threads disposed on the shell portion or the frame.

* * * * *